United States Patent [19]
Bédard et al.

[11] Patent Number: 6,091,720
[45] Date of Patent: Jul. 18, 2000

[54] DYNAMICALLY CONTROLLED ROUTING USING DYNAMIC MANAGEMENT OF INTRA-LINK TRAFFIC TO VIRTUAL DESTINATION NODES

[75] Inventors: François Bédard, Verdun; Jean Régnier, Laval; France Caron, Verdun, all of Canada

[73] Assignee: Nortel Networks Corporation, Montreal, Canada

[21] Appl. No.: 08/817,786

[22] PCT Filed: Oct. 26, 1995

[86] PCT No.: PCT/CA95/00600

§ 371 Date: Apr. 24, 1997

§ 102(e) Date: Apr. 24, 1997

[87] PCT Pub. No.: WO96/13945

PCT Pub. Date: May 9, 1996

Related U.S. Application Data

[63] Continuation of application No. 08/329,716, Oct. 26, 1994, Pat. No. 5,526,414.

[51] Int. Cl.[7] .......................... H04L 12/28; H04L 12/50; G01R 31/08; G06F 11/00
[52] U.S. Cl. ................... 370/351; 370/351; 370/357; 370/238; 370/254; 379/221; 379/224; 379/225
[58] Field of Search .................... 370/238, 254, 370/255, 357, 400, 401, 389, 392, 396, 397; 379/221, 224, 225, 220, 207

[56] References Cited

U.S. PATENT DOCUMENTS

| | | | |
|---|---|---|---|
| 4,284,852 | 8/1981 | Szybicki et al. | 179/18 EA |
| 4,669,113 | 5/1987 | Ash et al. | 379/221 |
| 4,788,721 | 11/1988 | Krishnan et al. | 379/221 |
| 5,142,570 | 8/1992 | Chaudhary | 379/221 |
| 5,297,137 | 3/1994 | Ofek et al. | 370/94.1 X |
| 5,311,585 | 5/1994 | Armstrong et al. | 379/221 |
| 5,377,262 | 12/1994 | Bales et al. | 379/221 |
| 5,526,414 | 6/1996 | Bedard et al. | 379/221 |
| 5,844,981 | 12/1998 | Pitchford et al. | 379/221 |
| 5,898,673 | 4/1999 | Riggan et al. | 370/237 |

FOREIGN PATENT DOCUMENTS

| | | | |
|---|---|---|---|
| 0 372 270 | 6/1990 | European Pat. Off. | H04Q 3/00 |
| 0 538 853 | 4/1993 | European Pat. Off. | H04Q 3/00 |

OTHER PUBLICATIONS

Dynamically Controlled Routing, by Hugh Cameron and Serge Hurtubise, Telesis 1986 one pp. 33–37.

(List continued on next page.)

*Primary Examiner*—Michael Horabik
*Assistant Examiner*—Man Phan
*Attorney, Agent, or Firm*—Thomas Adams

[57] ABSTRACT

A DCR telecommunications network comprises a plurality of network switching elements interconnected by circuit groups for carrying calls, and a network processor communicating with the network elements. If it cannot use a direct route to a neighbouring network element, the switching element may access a routing table containing alternate routes which are updated periodically by the network controller. The network functions as a group of nodes interconnected by links. Routing takes place on a node-to-node basis. At least one of the nodes is a virtual destination node, vis. a logical entity corresponding to a group of two or more components which are network elements. A link to the virtual destination node is a set of circuit groups connecting to its components. Final destinations outside the network can be associated with the virtual destination node as an intermediate destination node, thereby allowing a call to exit the DCR network via any of the components rather than via only one Unique Exit Gateway. Where a link to the virtual destination node comprises a plurality of circuit groups, the associated switching element stores proportions for those circuit groups. When attempting to route a call via the link to the virtual destination node, the switching element attempts the circuit groups in dependence upon the proportions. The proportions may be fixed, i.e. computed off-line and stored. Alternatively, the proportions may be updated by the network processor based upon call completion information it receives periodically from the switching elements.

30 Claims, 5 Drawing Sheets

OTHER PUBLICATIONS

State–Dependent Dynamic Traffic Management for Telephone Networks by Jean Régnier and W. Hugh Cameron, IEEE Communications Magazine Oct. 1990 pp. 42–53.

Design and Optimization of Networks With Dynamic Routing, by G.R. Ash, R.H. Cardwell and R.P. Murray, The Bell system Technical Journal, vol. 60, No. 8, Oct. 1981 pp. 1787–1820.

Servicing and Real–Time Control of Networks With Dynamic Routing, by G.R. Ash, A. H. Kafker and K.R. Krishnan, The Bell System Technical Journal vol. 60, No. 8, Oct. 1981 pp. 1821–1845.

A Distributed Protocol to Improve the Survivability of Trunk Networks by Coan et al International Switching Symposium, Session C6, Paper 2, vol. 4, May 28, 1990 Stockholm SE, pp. 173–179, XP 000130915.-

DYNAMICALLY CONTROLLED ROUTING USING DYNAMIC MANAGEMENT OF INTRA-LINK TRAFFIC TO VIRTUAL DESTINATION NODES

This application is a 371 of PCT/CA95/00600 filed Oct. 26, 1995 which is a c-i-p of application Ser. No. 08/329,716 filed Oct. 26, 1994 now U.S. Pat. No. 5,526,414, which are assigned to the same assignees as the instant application.

TECHNICAL FIELD

This invention relates to telecommunications networks and, in particular, to telephone networks employing dynamically controlled routing of calls.

BACKGROUND ART

For many years, the standard call routing method used by most North American telephone companies has been fixed hierarchical routing (FHR). In networks employing FHR, calls are sent from their origin network node to their destination network node along routes comprising a predetermined sequence of connection paths using circuit groups (truck groups) between successive nodes. At an origin node, a call is offered first to a direct circuit group. If all direct circuits are busy, the call is routed via a transit node. Should this alterative route prove to be busy as well, the network continues to search for a path, selecting alternative routes in a fixed, predetermined sequence from the most-direct to the least-direct route. Finally, if no connecting route can be found, the network blocks the call. The predetermined sequence of alternative routes is programmed into the network equipment and is "fixed" in the sense that any changes require human intervention.

While FHR remains the most prevalent routing method in North America, a number of developments, for example new services and deregulation, have led suppliers of telephone services to seek a more flexible alternative. As a result, in recent years, networks employing dynamic traffic management have been introduced, particularly so-called Dynamically Controlled Routing (DCR) networks which make use of the capabilities of modern stored program control switches with high-availability, real-time data processing abilities and the "intelligence" of a computer called the network processor (NP) to monitor the network and change the routing patterns periodically, in "near real-time". A general discussion of FHR and DCR networks appears in an article entitled "Dynamically Controlled Routing" by Hugh Cameron and Serge Hurtubise, in Telesis, Vol 1, 1986, published by Bell-Northern Research. An early version of dynamically controlled routing is disclosed in U.S. Pat. No. 4,284,852 issued August 1981.

DCR yields significant advantages in network control. It ensures the efficiency of switching equipment by preventing excessive traffic from reaching the machine; inhibits the spread of switching congestion; maintains circuit group efficiency by reducing the number of links per call when facilities are congested; and makes full use of available idle facilities. Of particular advantage is the DCR system's capability of coping with failure of a switch. The DCR network processor can download routing instructions for neighbouring switches enabling them to use available links to carry transit traffic around the failed switch. These features of DCR greatly improve the percentage of calls which are successfully routed through the network. Even so, increasing competition amongst suppliers of telephone services has motivated them to find ways of using the network equipment more efficiently to reduce costs and improve the completion rate of traffic handled by their networks.

One aspect susceptible of improvement is the procedure governing the way in which a call exits the DCR network for a final destination outside the DCR network, possibly in another network. Known DCR networks use a procedure inherited from FHR known as Unique Exit Gateway. Since there are many different destinations, most of them outside the DCR network, each final destination is associated with an intermediate destination node within the DCR network. Calls in the DCR network which are destined for a particular final destination are then routed to the associated intermediate destination node. From the intermediate destination node, the calls are routed to the final destination, possible using other networks than the DCR network. If the intermediate destination node is affected by congestion or a failure, all calls associated with that intermediate destination node will be affected. Although the network could be reconfigured to allow other networks elements to route calls to the final destination, the current routing scheme could not efficiently use them as alternative exit points. This detracts from the improvements in survivability that can be achieved by DCR networks in case of equipment failures.

DISCLOSURE OF INVENTION

According to one aspect of the present invention, there is provided a telecommunications network comprising:

a plurality of network nodes and links, the network nodes comprising origin nodes, each comprising a switching element capable of routing calls within the network, and destination nodes serving as destinations for such calls, some of said network nodes being transit nodes, each transit node being both a destination node and an origin node;

each link interconnecting directly an origin node and a destination node and comprising one or more circuit groups, each of the switching elements having storage means for routing information, the routing information comprising (i) a listing of destination nodes;

(ii) associated with each destination node, a corresponding link, where such a link exists;

(iii) for each link, a corresponding group of one or more circuit groups outgoing from the switching element; and (iv) associated with each destination node, a list of zero or more transit nodes;

each switching element comprising means for translating address data of a call to determine a destination node for the call and (i) wherein a link to the destination node exists, attempting to route the call to the destination node via a circuit group that is in the link;

(ii) wherein a link to the destination node is not available, accessing its routing information to select a transit node and attempting to route the call via a circuit group that is in the link to the transit node;

wherein said listing of destination nodes of at least one of said switching elements, said one of said switching elements being one of said origin nodes, comprises a virtual destination node representing a group of two or more components, each component being a distinct physical network element, there being one or more distinct circuit groups associated with each component, and the link from said one of said origin nodes to the virtual destination node is a set of circuit groups from the switching element at that one of said origin nodes to the two or more components of the virtual destination mode; said link from said one of said origin nodes to the virtual destination node comprises a plurality of circuit groups, the storage means of said one of said switching elements includes a specified proportion for each of those circuit groups and, when attempting to route a call via said link from said one of said origin nodes to the virtual destination node, said one of said switching elements attempts the circuit groups in dependence upon the specified proportions; and said one of said switching elements is arranged, in attempting to route a call via said link to the virtual destination node to:

(i) determine the set S of all circuit groups with a non-zero proportion in said plurality of circuit groups;

(ii) determine whether or not the set S is empty;

(iii) cause the call to overflow if the set is empty;

(iv) if the set is not empty, make a weighted ransom selection of one of the circuit groups of the set S, and attempt to route the call via such circuit group;

(v) if the selected circuit group does not have a circuit idle, remove the selected circuit group from the set S; and (vi) repeat steps (ii) through (v) until the call is carried or all circuit groups in the set have been exhausted and the call overflowed.

The network may further comprise network processor means communicating with the switching elements via a data communications system, such network processor means computing alternate routing information in dependence upon the information communicated thereto by the switching elements and periodically updating the information identifying transit nodes.

The network processor means may comprise a common network processor coupled to all of said switching elements by the data communications system. Periodically, each of said switching elements communicates to such common network processor information about network conditions local to the switching element and receives from the network processor alternate routing information including recommended transit nodes. The network processor computes the alternate routing information for each switching element in dependence upon the information communicated thereto by all of the switching elements, and updates transit node recommendations on the basis of information communicated to the network processor by the switching elements.

Preferably, when computing alternate route recommendations, the network processor takes into account full availability of each of the links, including links composed of a plurality of circuit groups.

Alternatively, the network processor means may comprise a plurality of network processors, each switching element being coupled to at least one network processor.

The proportions may be fixed, i.e. computed off-line and stored in the storage means under the control of a human operator. Alternatively, the proportions may be updated automatically.

In one embodiment in which the proportions are updated automatically, one or more of the components of a virtual destination node communicates to a central processor, conveniently the network processor, information related to the ability of that component of the virtual destination node to complete calls to a final destination served by the virtual destination node. The central processor uses this information, and other information such as, for example, number of idle circuit groups in all of the network, to compute the proportions and supplies the newly-computed proportions to the appropriates switching elements. The latter employ the newly-received proportions for subsequent routing of calls, i.e. until the next update.

Each component of the virtual destination node may itself act as a node. In such a case, a switching element which represents both an individual node and a component of a virtual destination node, when communicating with the central processor, will communicate status information on behalf of the individual node and, distinct therefrom, information on behalf of the virtual destination node.

In an alternative embodiment in which the proportions are updated automatically, said switching element at said one of said origin nodes has means for monitoring completion rates for calls to the virtual destination node, particularly failure to complete a call for reasons under the direct or indirect control of, and remediable by, the DCR network, and means for updating said proportions in dependence thereupon.

Thus, the switching element may monitor overflow calls and existing signalling messages (standard CCS7 messages), and process this data itself. The signalling messages that can be monitored by the switches for this purpose conveniently are so-called Release With Cause (RWC) messages which are sent whenever a call cannot be completed.

According to a further aspect of the invention, there is provided a method of routing calls in a telecommunications network, such network comprising:

a plurality of network nodes and links, the network nodes comprising origin nodes, each comprising a switching element capable of routing calls within the network, and destination nodes serving as destinations for such calls, some of said network nodes being transit nodes, each transit node being both a destination node and an origin node;

each link interconnecting directly an origin node and a destination node and comprising one or more circuit groups, each of the switching elements having storage means for routing information, the routing information comprising (i) a listing of destination nodes;

(ii) associated with each destination node, a corresponding link, where such a link exists;

(iii) for each link, a corresponding group of one or more circuit groups outgoing from the switching element; and (iv) associated with each destination node, a list of zero or more transit nodes;

each switching element comprising means for translating address data of a call to determine a destination node for the call;

said link from said one of said origin nodes to the virtual destination node comprising a plurality of circuit groups, and the storage means of said one of said switching elements including a specified proportion for each of those circuit groups;

the method comprising the steps of, at each switching element at an origin node:

(i) where a link to the destination node exists, attempting to route the call to the destination node via a circuit group that is in the link;

(ii) where a link to the destination node is not available, accessing the routing information to select a transit node and attempting to route the call via a circuit group that is in the link to the transit node;

comprising the steps of: including in the listing of destination nodes of at least one of said switching elements, said one of said switching elements being at one of said origin nodes, a virtual destination node representing a group of two or more components, each component being a distinct physical network element, there being one or more distinct circuit groups associated with each component; the link from said one of said origin nodes to the virtual destination node being a set of circuit groups from said one of said switching elements to the two or more components of the virtual destination node; and, when attempting to route a call to said virtual destination node via the link from said one of said origin nodes to the virtual destination node, attempting to route the call using one of said set of circuit groups, wherein, when attempting to route a call via said link from said one of said origin nodes to the virtual destination node, said one of said switching elements attempts the circuit groups in dependence upon the specified proportions, and wherein, in attempting to route a call via said link to the virtual destination node, said one of said switching elements (i) determines the set S of all circuit groups with a non-zero proportion in said plurality of circuit groups;

(ii) determines whether or not the set S is empty;

(iii) causes the call to overflow if the set is empty;

(iv) if the set is not empty, makes a weighted random selection of one of the circuit groups of the set S, and attempt to route the call via such circuit group;

(v) if the selected circuit group does not have a circuit idle, remove the selected circuit group from the set S; and (vi) repeats steps (ii) through (v) until the call is carried or all circuit groups in the set have been exhausted and the call overflowed.

BRIEF DESCRIPTION OF THE DRAWINGS

Various objects, features, aspects and advantages of the present invention will become more apparent from the following detailed description, taken in conjunction with the accompanying drawings, of preferred embodiments of the invention, which are described by way of example only.

BEST MODES FOR CARRYING OUT THE INVENTION

1. The DCR Network (without virtual destination nodes)

Figure 1:
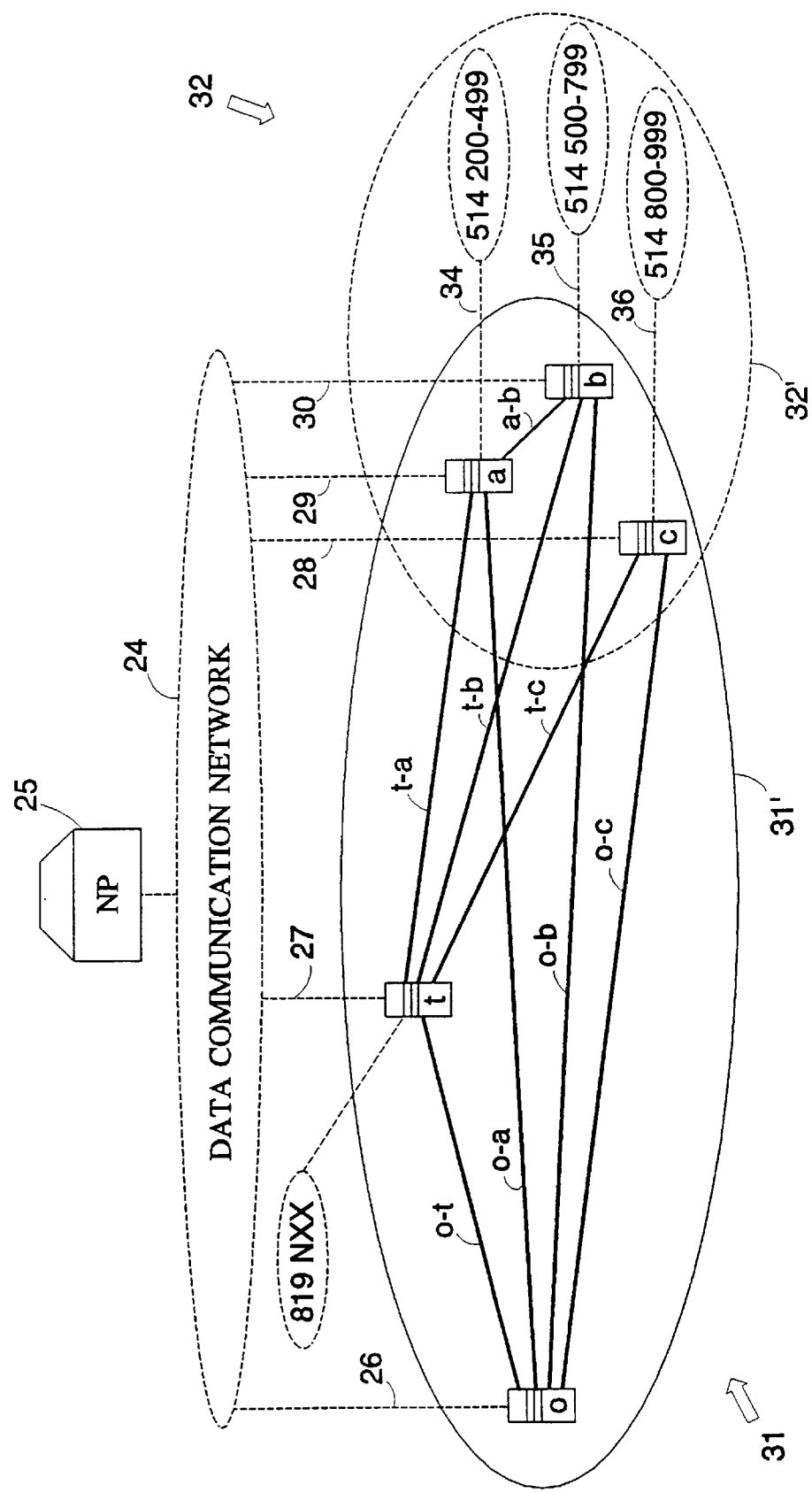
FIG. 1 is a simplified diagram of a dynamically controlled routing (DCR) network and a second (terminating) network according to the prior art.

Before the preferred embodiments of the invention are described, a simplified DCR network, and its operation, will be described briefly with reference to FIG. 1 in order to facilitate comprehension of how and where the virtual destination nodes of the present invention are to be implemented. For purposes of illustration only, the DCR network 31 illustrated in FIG. 1 is shown as comprising five circuit switches interconnected by sets of circuit groups. Lower case letters o, t, a, b and c have been used to designate the switches and the circuit groups are identified by pairs of letters o-t o-a, o-b, o-c, t-a, t-b, t-c and a-b, representing the two switches they are connecting.

It should be noted that a circuit group may be two-way. In the DCR network 31 all circuit groups are two-way. For example, circuit group o-t is used from o to t and from t to o.

A data communications network 24 connects a network processor 25 to the switches o, t, c, a and b by way of data lines 26, 27, 28, 29 and 30, respectively. The data communications network may comprise a packet switched network or dedicated lines of known type which will not be described in detail here.

Each of the DCR switches o, t, a, b and c will have memory for storing information in the form of tables, including translation and routing tables, which the switch will use when routing a call, as will be described later. The routing information can be updated manually, either by way of a user interface at each switch or at a central location. It can also be updated automatically as will be described later.

Even though the DCR alternate route selection process is centralized, routing is still performed locally by the switches. Therefore, a means of representing the network that can be used both locally by the switches and globally by the NP 25 needs to be defined. For this purpose the DCR system uses a model of the network that describes the network as a set of nodes, links and origin-destination (O-D) pairs.

Nodes represent origins and destinations known to the DCR network elements and to the NP 25. Routing always proceeds from an origin node to a destination node. Generally speaking, all destination nodes are known to all origin nodes, because DCR has a global view of the network.

A link is the set of DCR circuit groups from a node to another node. Links are directional, so the link A-B (from node A to node B) and the link B-A (from node B to node A) are different, even though they might use the same physical circuit groups. In the DCR network 31 shown in FIG. 1, each of the switches o, t, a, b and c would typically act as a network node and each of the two-way circuit groups o-t, o-a, o-b, o-c, t-a, t-b, t-c and a-b would be part of two links (one for each direction), but it should be noted that such correspondence is not necessarily the case in all embodiments of the invention.

Participating switches o, t, a, b and c within the DCR network 31 report to the network processor 25 periodically, for example every ten seconds, with information concerning the status of their associated circuit groups and traffic volumes. Typically, each switch will monitor and report the occupancy of its outgoing circuit groups, and particulars of the calls processed during the previous 10 second period, such as how many calls overflowed the direct link.

The network processor 25 processes the information from all of the communicating switches o, t, a, b and c to locate the capacity available for supporting additional calls and to determine, for each node pair, the best alternate route for calls which cannot be routed via the direct route. These alternate routes are communicated to the respective switches as recommendations. The switches o, t, a, b and c update their routing tables accordingly. This update cycle is repeated every ten seconds.

These dynamic alternate routes generally are only two links long with one intervening transit node. In practice, the recommendation from the NP 25 identifies the transit node for each destination node listed at that switch. The selection of the transit node is based upon the idleness of the two links of the resulting route. The NP 25 evaluates the idle capacity of all potential routes, and selects the route with the maximum idle capacity as the recommendation. The idle capacity of an alternate route is considered to be the minimum of the capacity of its two links. This evaluation also takes into account the use of each link by its direct traffic. A protective allowance for direct traffic is considered in the evaluation of the idle capacity. This enables alternate-routed calls to be deflected from routes likely to be required for supporting direct-routed calls. Hence, when a link has only a few idle circuits available, it will not be used to carry overflow calls from other nodes so as to prevent overflow calls from cascading through the network and blocking direct traffic in one link after another.

The whole process, from communication of measurements to the network processor 25 to implementation of the recommendations, occurs within the update cycle, and repeats every update cycle to maintain the alternate routes adapted to current networks conditions.

In DCR networks, routing is node-and-link based, rather than switch and circuit group based. Routing decisions at the switches depend upon the origin node and the destination node. When routing a call, each of the DCR switches o, t, a, b and c will use various tables, including translation and routing tables, to determine from the call the corresponding destination node and outgoing circuit groups to attempt in order to dispose of the call. Thus, when a switch receives a call it will first try to send it to the destination node by the direct route, if it exists. If the call is unable to take the direct route, the switch will then refer to its routing table for the best available route using a transit node and two links as per the most recent update. Generally, the alternative routes will only comprise two links. Alternative routes which comprise three links are usually not permitted. However, if there is neither a direct route nor a two-link route between the node handling the call and the destination node, the call is routed via a link to a transit node closer to its destination node.

For example, if a call originates in the DCR network 31 at switch o and is to be routed to switch b, switch o will use its translation and routing tables to determine that the direct route is via circuit group o-b and attempt to route the call by that circuit group. If the attempt fails, the switch o will select the recommended alternate route from its routing tables and attempt that. (The alternate route would also be selected if a direct link did not exist). Although the DCR network 31 has two such alternate routes between switch o and switch b, only that which has been recommended by the network processor 25 will be attempted, for example via circuit group o-t, switch t and circuit group t-a.

Most final destinations would, in fact, be outside the DCR network 31. Thus, in FIG. 1, the boundary of the DCR network 31 is represented by an ellipse 31'. The boundary of a separate network 32 is illustrated by chain-link ellipse 32'. This separate network need not be a DCR network but could, for example, be an FHR network. It will be seen that switches a, b and c are common to both the DCR network 31 and the separate network 32. Switches a, b and c are shown associated, as by lines 34. 35 and 36, respectively, with final destinations within the 514 Numbering Plan Area. Likewise, final destinations within the 819 Numbering Plan Area are shown associated with switch t. These final destinations are outside the DCR network 31. Each such external final destination is associated with an intermediate destination node within the DCR network 31. A call is not allowed to exit from the DCR network via a node which is not its intermediate destination node. All other destinations handled by the network must also be assigned to some specific destination node.

Thus, in FIG. 1, a call originating from the DCR network at switch o with a final destination 514 254 1111 would be routed to switch a by the DCR network. From there, network 32, now the terminating network, would attempt to route the call to its final destination. While network 32 might, if reconfigured, be capable of routing calls from switch b to that final destination, it is not given an opportunity to do so because the call to final destination 514 254 1111 is not allowed to exit the DCR network via switch b. The DCR network 31 might use switch b as a transit, e.g. o→b→a, but the call may only exit via its designated intermediate destination node which in this case represents switch a.

It will be appreciated that the intermediate destination node is critical and congestion or failure at its switch would result in failure to complete the call. Clearly, this detracts from the improvements in call completion rate and survivability attained by the DCR network 31. The present invention addresses the problem by means of virtual destination nodes.

2. DCR network with virtual destination nodes

Figure 2:
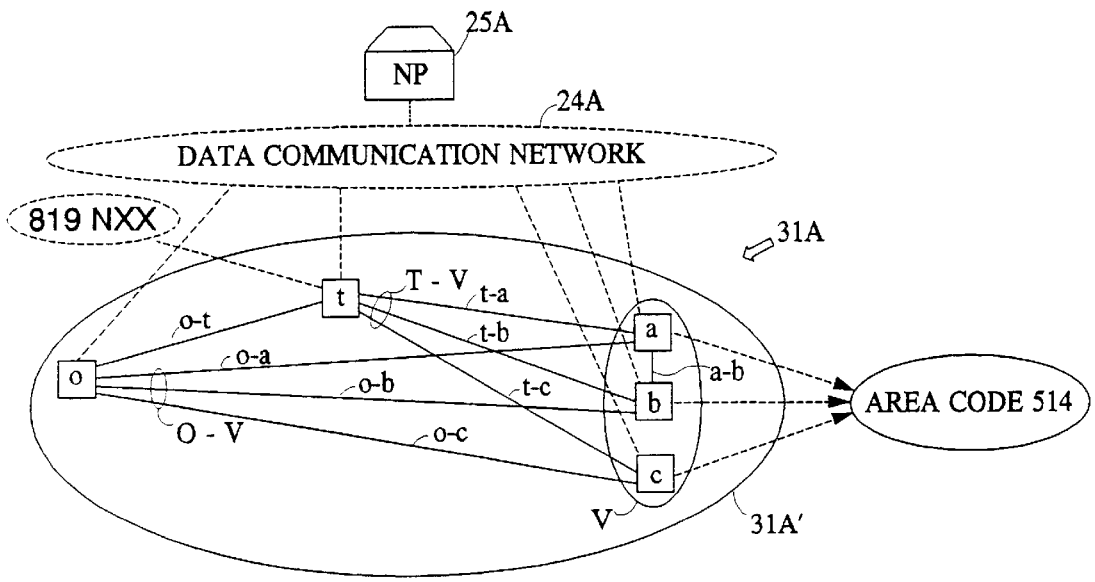
FIG. 2 represents switches and circuit groups of a DCR network employing a virtual destination node according to one embodiment of the present invention.
Figure 3:
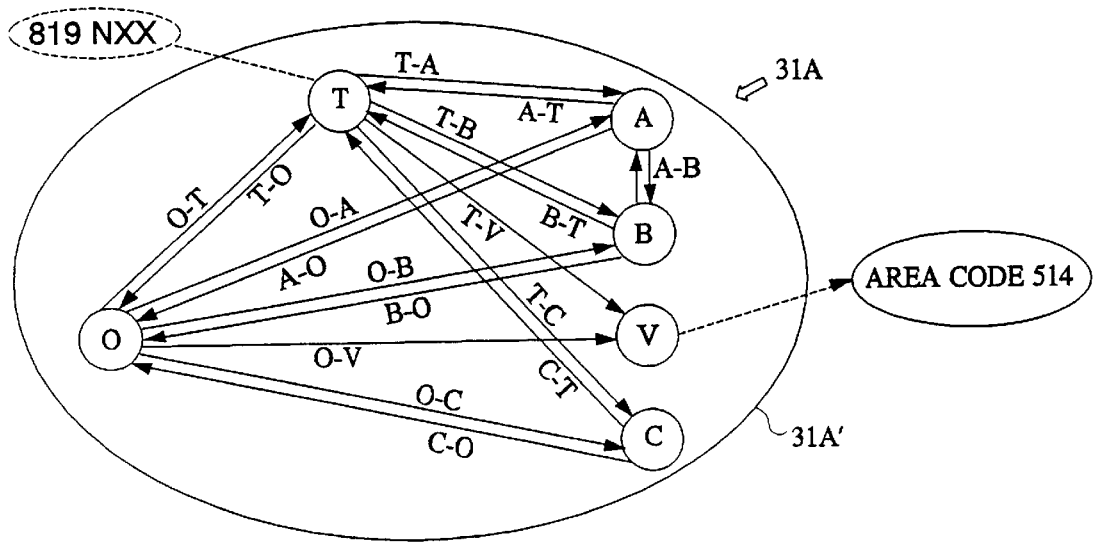
FIG. 3 illustrates represents nodes and links of the DCR network of FIG. 2.
Figure 4:
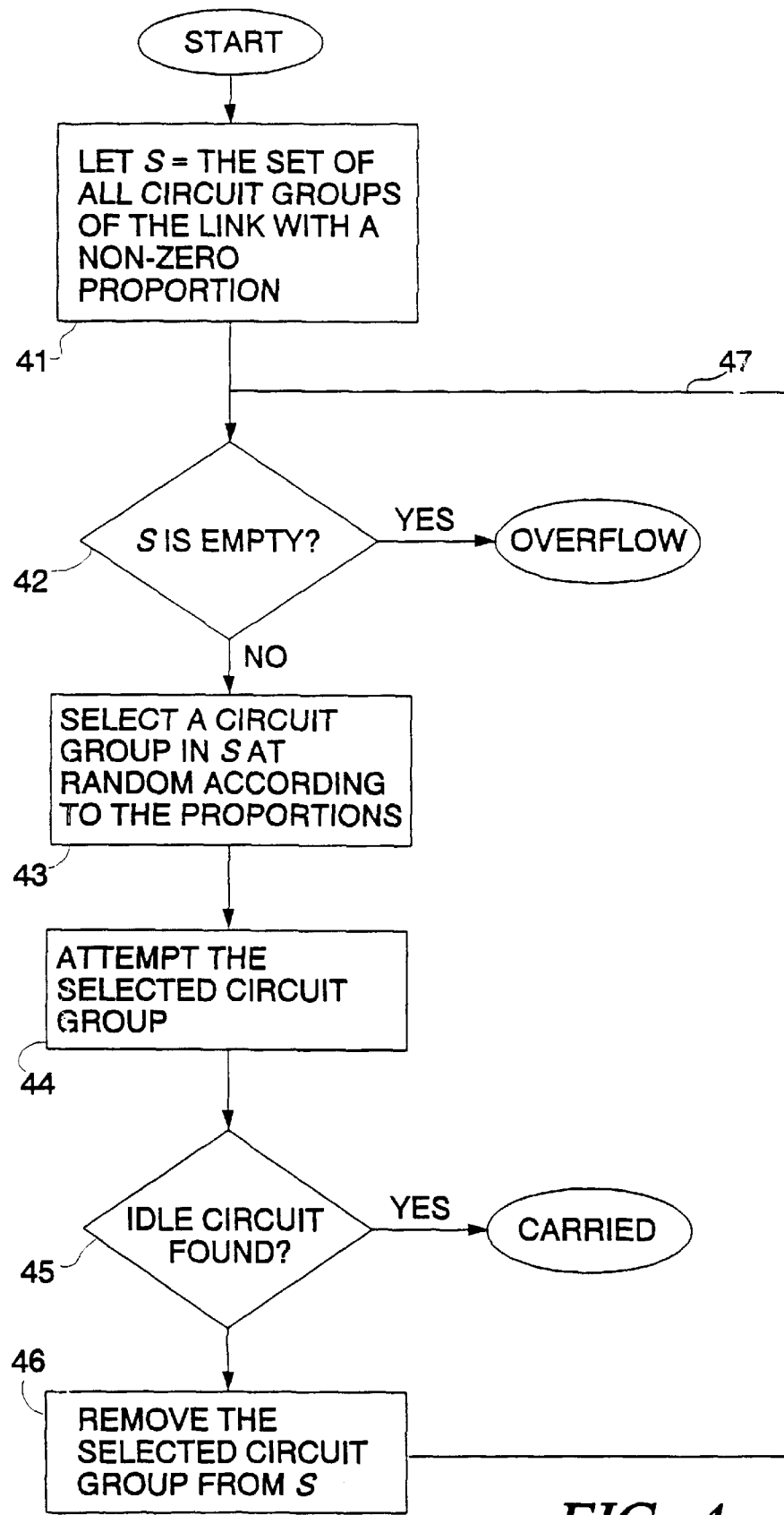
FIG. 4 is a simplified flowchart of an algorithm for performing call distribution within a link to the virtual destination node.

A specific embodiment of the present invention will now be described with reference to FIGS. 2 and 3 and the flowchart of FIG. 4. Comprehension of the invention will be facilitated by recognizing that the DCR network comprises a physical network of switches and interconnecting circuit groups; and a logical network of nodes and interconnecting-network links; and there is not necessarily one-to-one correspondence between physical switches and network nodes or between circuit groups and network links. The distinction can be seen from FIGS. 2 and 3, which illustrate, diagrammatically, a DCR network 31A employing a virtual destination node V according to the present invention. FIG. 2 illustrates the physical network of switches and interconnecting circuit groups whereas FIG. 3 illustrates network nodes and links. The use of the suffix A indicates that the DCR network 31A corresponds, but is not identical, to DCR network 31 of FIG. 1. While the DCR network of FIGS. 2 and 3 is physically similar to that shown in FIG. 1, the operation differs, as does the information stored at, and transmitted between, the switching elements and the NP.

2.1 Virtual destination nodes

In DCR networks embodying the present invention, nodes are origins and destinations known to the DCR network elements and to the NP 25A. Nodes can play two different roles in the network:

Origin node: a physical entity that represents a switch that can route calls within the network. Each origin node must represent a different switch.

Destination node: a logical entity that represents a destination for DCR traffic. Most of the time, a destination node represents a single switch. However, it may also represent a group of two or more switches.

While some nodes are transit nodes which are both origin nodes and destination nodes, a virtual destination node can only be a destination node. A virtual destination node represents any group of one or more physical network elements. The elements of the group are called "components". The routing to a virtual destination node depends on its entire group of components rather than on a single component.

A link from an origin node X to a destination node Y is composed of the circuit groups from X to Y. Therefore, if Y is a virtual destination node, the DCR link X-Y is composed of the circuit groups from X to each of the components of virtual destination node Y. There is, however, one exception: there is no link from X to Y if Y can be reached from X without using any circuit group, i.e. if X and Y are served by at least one common physical element.

Furthermore, virtual destination nodes are not origin nodes and do not have outgoing links. A virtual destination node does not need to communicate with the NP 25A and is used only as a destination node.

In FIG. 2, virtual destination node V is represented by an ellipse V around switches a, b and c, which are components of the virtual destination node. Each of the switches a, b and c continues to be a node in its own right, so the DCR network 31A, represented as nodes and links, is as shown in FIG. 3. The nodes are designated by upper case letters and the links by pairs of upper case letters. The virtual destination node is created by programming the network processor 25A with information as to the components which correspond to the virtual destination node and each set of circuit groups which comprises a link to it. In addition, the other switches in the DCR network, i.e. which are origin node switches not associated with the components of the virtual destination node, are apprised of the existence of the virtual destination node and its definition, i.e. their routing tables include particulars for the virtual destination node along with those of other nodes. They are programmed to route a call to any of the components in the group if the call is destined for the virtual destination node.

Referring to FIGS. 2 and 3, the DCR network 31A comprises six nodes A, B, C, O, T, and V. Nodes A, B, C, O, and T represent one switch each (switches a, b, c, o, and t respectively). Node V is a virtual destination node. It has three components, which are the switches a, b, and c, that handle calls to subscribers in area code 514. Switches a, b and c may still be used for other functions.

The same physical element can belong to more than one node. Therefore, the creation of a virtual destination node does not force other nodes to be eliminated, modified or created. Thus, switch a belongs both to node A and to node V, switch b belongs to nodes B and V, and switch c belong to nodes C and V. Conversely, a switch does not need to act as a node to be included in a virtual destination node.

In the DCR network 31A, there are 18 links as shown in FIG. 3. Sixteen of them are composed of only one circuit group. The link O-V is composed of the three circuit groups o-a, o-b and o-c; and the link T-V is composed of the three circuit groups t-a, t-b and t-c. There are no A-V, B-V, or C-V links because a, b, and c are associated with components of V. There are also no links from V, because it is a virtual destination node.

The same circuit group can belong to more than one link. For example, circuit group o-a belongs to the three links A-O, O-A, and O-V.

Each call is routed logically by the usual DCR algorithm, i.e. the direct link first if it exists and, if necessary and available, one two-link alternate route.

In the example, a call from O to V would attempt the link O-V, and possibly the two-link alternate route O-T-V. A call from B to T would attempt the link B-T, and possibly one of the two-link alternate routes B-A-T or B-O-T.

Whereas previously, in the DCR network 31 of FIG. 1, the final destinations for calls in area code 514 were in three groups associated with the three switches a, b and c, respectively, as their intermediate destination nodes, the network 31A of FIGS. 2 and 3 has all calls to area code 514 associated with the virtual destination node V instead. Thus, the virtual destination node V enables the use of a group of switches a, b, c (rather than a single switch) as an intermediate destination node. The switches in the group can then be used interchangeably as exit points for the final destination.

2.2 Intra-link traffic distribution algorithm using "fixed" proportions

As mentioned, in the DCR network, routing is node and link based, as opposed to switch and circuit group based. The links O-V and T-V to virtual destination node V are each composed of more than one circuit group, so the switch, o or t as the case may be, must determine the order in which these circuit groups should be attempted when the corresponding link has to be attempted.

The intra-link traffic distribution algorithm is used by the switch's processor and takes as parameters the current respective proportions for the circuit groups in the link to a virtual destination node and distributes the calls on these circuit groups randomly according to the specified proportions. The algorithm is represented by the flowchart of FIG. 4. Briefly, in step 41 and decision box 42, the switch determines whether or not S, the set of all circuit groups within the link with a non-zero proportion is empty. (If the current proportion of a circuit group is zero, for example because of temporary network management controls, it is excluded from consideration). If the set S is empty, because no circuits are available in circuit groups with non-zero proportions, the call is treated as overflow. If the set is not empty, the switch selects a circuit group at random according to the proportions set out in the table (step 43) and attempts to route the call via that circuit group (step 44). If an idle circuit is found, (decision box 45), the call is carried. If no idle circuit is found, in step 46 switch removes the selected circuit group from the set S and returns via loop 47 to decision step 42. The cycle repeats until the call is carried or all circuit groups in the set S have been exhausted and the call overflowed.

When selecting a circuit group at random, the probability of selecting a given circuit group is always proportional to its specified proportion. For example, consider a link composed of three distinct circuit groups named o-a, o-b, and o-c. Assume that the proportions 50%, 30%, and 20% are specified for o-a, o-b, and o-c, respectively. When the link has to be attempted, the first circuit group attempted may be o-a, o-b, or o-c with probabilities ½, ³⁄₁₀, and ⅕, respectively (proportional {and equal in this case} to 50%, 30%, and 20%). If o-a is selected first and another circuit group is required, the next selected circuit group may be o-b or o-c with probabilities ⅗ and ⅖ respectively. If o-b is then selected and yet another circuit group is required, the next selected circuit group will be o-c with probability 1. If still another circuit group is needed, the call overflows the link since there are no more choices available.

Table I below summarizes how the calls are spread in the above example:

TABLE I

DISTRIBUTION OF CALLS
(WHEN THE DESIRED PROPORTIONS ARE 50%-30%-20%)

| Order of Use of Circuit Groups | Proportion of Calls |
| --- | --- |
| o-a,o-b,o-c | $50\% \cdot \dfrac{30\%}{30\% + 20\%} = \dfrac{3}{10}$ |
| o-b,o-a,o-c | $30\% \cdot \dfrac{50\%}{50\% + 20\%} = \dfrac{3}{14}$ |
| o-a,o-c,o-b | $50\% \cdot \dfrac{20\%}{30\% + 20\%} = \dfrac{1}{5}$ |

TABLE I-continued

DISTRIBUTION OF CALLS
(WHEN THE DESIRED PROPORTIONS ARE 50%-30%-20%)

| Order of Use of Circuit Groups | Proportion of Calls |
|---|---|
| o-c,o-a,o-b | $20\% \cdot \dfrac{50\%}{50\% + 30\%} = \dfrac{1}{8}$ |
| o-b,o-c,o-a | $30\% \cdot \dfrac{20\%}{50\% + 20\%} = \dfrac{3}{35}$ |
| o-c,o-b,o-a | $20\% \cdot \dfrac{30\%}{50\% + 30\%} = \dfrac{3}{40}$ |

This intra-link traffic distribution algorithm has no memory. Each time the link is attempted, all circuit groups (with non-zero proportion) can be attempted, and the algorithm does not take into account choices of circuit groups made in previous link attempts. Other traffic distribution algorithms can be devised to distribute calls according to the proportions. For example "round robin" techniques could be used.

2.3 Routing a call

An example of how a call is routed will now be described with reference to FIGS. 2 and 3 and Table II below. As mentioned previously, each switch that acts as an origin node keeps information about nodes and links of the DCR network 31A in special tables which are needed to implement DCR. Creation of the virtual destination node V requires changes to translation and routing tables to enable the switch to translate correctly address data of the call to identify destination node V and to the main DCR table which lists all nodes with the corresponding outgoing link and current alternate route recommendation for overflowing calls, specifically the identification of the directly-linked node to be used as a transit. Table II is such a table for the switch at node O.

TABLE II

ROUTING TABLE AT SWITCH o

| | | Link Definition | | |
|---|---|---|---|---|
| Destination Node Name | Current Recommendation | Circuit Group Index | Circuit Group Name | Associated Proportion |
| A | B | 1 | o–a | 100% |
| B | A | 1 | o–b | 100% |
| C | T | 1 | o–c | 100% |
| T | C | 1 | o–t | 100% |
| V | T | 1 | o–a | 50% |
| | | 2 | o–b | 30% |
| | | 3 | o–c | 20% |

Consider a call originating at node O and destined for final destination 514-555-5490. Switch o translates this number into the associated intermediate destination node, which is virtual destination node V. It then uses DCR to route the call to virtual destination node V. The first step is to attempt the direct link to V. To do this, the switch o accesses routing table II, searches for node V, and then attempts to carry the call on the associated link O-V by executing the intra-link distribution algorithm described above. This link O-V contains the circuit groups o-a, o-b, and o-c. If the call overflows the direct link O-V (i.e. none of its circuit groups are available), the switch refers to the routing table for the current NP recommendation for V, which is T in this example, and then has to attempt the link to the recommended transit node T. To do this, the switch o accesses the routing table II again, searches for node T, and then attempts to carry the call on the associated link O-T using circuit group o-t by executing the intra-link distribution algorithm of the preceding section. If the call overflows this link, it overflows the DCR network 31A and receives the appropriate treatment.

If the call gets to the transit switch t, the number associated with the destination is once again translated by the switch t into the same intermediate destination node, which is V. Switch t recognizes that it is being used as a transit or tandem node because the call is incoming from a DCR switch (this is done by accessing another DCR table). Consequently, switch t may only attempt the direct link to virtual destination node V. To do this, the switch t accesses the main table, searches for node V, and then attempts to carry the call on the associated link T-V by executing the intra-link distribution algorithm as described above. This link T-V contains the circuit groups t-a, t-b, and t-c, but proportions at T need not be the same as those at O. If the call overflows this link, it overflows the DCR network and receives the appropriate treatment.

If the call gets to a, b, or c, it has reached its intermediate destination node, i.e. virtual destination node V, is recognized as such by a, b, or c during the translation process, and exits the DCR network 31A. No DCR routing will occur at a, b, or c for calls to virtual destination node V. In fact, nodes A, B, and C do not know node V exists as it is not entered in the main DCR tables of their switches a, b and c, respectively.

2.4 Status reports

As mentioned previously, each of the DCR switches a, b, c, o and t monitors the occupancy of the circuit groups associated with it. When reporting to the NP 25A, it reports the status of its outgoing links, including the number of idle circuits on its circuit groups and the total number of direct calls that overflowed the link during the period since the last update. The direct calls that overflowed the link include only the calls that overflowed all circuit groups of the link, as indicated in the intra-link traffic distribution algorithm described with reference to FIG. 4.

2.5 Protective allowance and safe idle circuits

In DCR networks, circuit groups can carry bath direct-routed traffic and alternate-routed traffic. When a link nears saturation, it is preferable to discourage alternate-routed traffic from seizing the remaining idle circuits on the link, in order to allow traffic to complete directly. The DCR algorithm embodies a mechanism to achieve this purpose. This mechanism is based on protective allowances (PA). A PA is associated with each link and preserves capacity for direct traffic. It reflects the need that the traffic has for circuits on its direct link.

The protective allowance can be static, in which case its value is equal to a given percentage of the size of the link (which is the total of the number of circuits of all circuit groups in the link). An appropriate value for such purpose is 3% of the size of the link. Alternatively, the protective allowance can be dynamic. For details of dynamic protective allowances, the reader is directed to "Simulation of Dynamic Routing: Critical Path Selection Features for Service and Economy", W. H. Cameron, ICC Conference 1981; and "State-dependent Dynamic Traffic Management for Telephone Networks", Jean Régnier and W. H. Cameron, IEEE Communications, November 1991, both of which are incorporated herein by reference.

In the DCR algorithm, access to alternate routes by traffic overflowing a direct link is influenced by the direct traffic that the links of the alternate routes support. For this purpose, a number of safe idle circuits (SIC) is computed for each link. It is defined as the difference between the number of idle circuits (IC) on the link and the PA of all the direct traffic that the circuit groups of the link support. The capacity of the alternate routes for a directly-connected pair is then based on the SIC values of their links. These computations apply only for determining the alternate route for traffic overflowing from a direct link. For traffic without a direct link, the alternate routes are based on the total number of Idle Circuits (IC), without taking into account the PAs.

In DCR without virtual destination nodes, the circuit group between two switches, say o, (associated with node 0) and a (associated with node A), can belong to a maximum of two links: the O-A and A-O links. In this context, the SIC for the O-A and A-O links can be determined simply by considering the PA for the O-A and A-O direct traffic.

With the introduction of virtual destination nodes, the association between circuit groups and links becomes more complex. Links to virtual destination nodes are made of circuit groups which can also belong to other links. For instance, in the example of the preceding paragraph, if a is associated with a component of a virtual destination node V, the circuit group o-a can also belong to link O-V, in addition to links O-A and A-O.

Links to virtual destination nodes are considered as single fully-available entities for the purpose of routing and alternate route selection, just like links to non-virtual destination nodes. They have their own direct and overflow traffic, and link measurements. For purposes of routing, calls offered to a link to a virtual destination node have access to all the idle circuits on the link. For purposes of alternate route selection, a link to a virtual destination node is considered on the basis of global link measurements, such as its total number of idle circuits and the total PA that applies to its circuit groups.

As virtual destination nodes introduce their own links and direct traffic, and as these links can be defined with respect to the same circuit groups as other links, the relationship between circuit groups and direct traffic protection becomes more complex than with previous DCR networks. In this new context, it becomes possible, and indeed desirable, to employ a new computation algorithm for the ICs and SICs so as to spread the reservation for direct traffic on all the circuit groups that may support it, and thereby better manage the competition for resources among the links that contain the same circuit group(s).

Two new algorithms will be described. The first needs the following information to run.

$G_l$ The set of circuit groups of link l;

$IC_g$ The reported number of idle circuits on circuit group g;

$L_g$ The set of the links that contain circuit group g;

$P_{l,g}$ The proportion used for intra-link traffic distribution, for circuit group g of link l. These proportions are those supplied by the user and used by the intra-link traffic distribution algorithm described above;

$PA_l$ The protective allowance computed for link l, as in current DCR products and mentioned above.

The new algorithm first computes, for each link l, the number of idle circuits $IC_l$ which is the sum of the numbers of idle circuits on each of its circuit groups:

$$IC_l = \sum_{g \in G_l} IC_g$$

Then, for each link, the PA value is distributed among the circuit groups of the link. The reservation $RSV_g$ on circuit group g is then equal to $$RSV_g = \min\left(\sum_{m \in L_g} P_{m,g} \cdot PA_m, IC_g\right)$$

This produces a total reservation level $RSV_l$ for link l equal to:

$$RSV_l = \sum_{g \in G_l} RSV_g$$

Finally, for each link l, the number of safe idle circuits $SIC_l$ is equal to:

$SIC_l = IC_l - RSV_l$

These formulas enable the network processor to compute its recommendations for any node pair O-D, where D may be a virtual destination node, using the current DCR algorithm. This algorithm basically selects the two-link path O-T-D for which both links O-T and T-D are the most available.

If D is a virtual destination node, the link T-D may be composed of a plurality of circuit groups. The new recommendation algorithm is adapted to this situation since it takes into account the idle capacity on all the circuit groups of the links. Furthermore, reservation levels on circuit groups are taken into account for all alternate routed calls. This ensures "enlightened" routing recommendations from the network processor.

The second new call distribution algorithm, which is preferred, dispenses with the use of the proportion $P_{l,g}$. Instead, the distribution algorithm may compute the number of idle circuits $IC_l$, using the formula set out above, and then, when distributing the PA value among the circuit groups of the link, compute the reservation $RSV_g$ on circuit group g by the following steps:

Step 1. For all links l and circuit groups g, if the current $RSV_{l,g} = 0$, then its value is adjusted before proceeding with the following steps. It becomes:

$$RSV_{l,g} = \min\left(\frac{IC_g}{\#L_g}, \frac{PA_l}{\#G_l}\right)$$

where $\#L_g$ is the number of links that contain circuit group g and $\#G_l$ is the number of circuit groups in link l.

Step 2. The requested reservation $RRSV_{l,g}$ on circuit group g for link l is computed by distributing its PA among its circuit groups, using the following formula:

$$RRSV_{l,g} = \begin{cases} PA_l \cdot \dfrac{RSV_{l,g}}{\sum_{h \in G_l} RSV_{l,h}} & \text{if } \sum_{h \in G_l} RSV_{l,h} > 0 \\ PA_l \cdot \dfrac{1}{\#G_l} & \text{otherwise} \end{cases}$$

where $\#G_l$ is the number of circuit groups in link l.

Step 3. The new reservation $RSV_{l,g}$ on circuit group g for link l is then computed as:

$$RSV_{l,g} = \begin{cases} 0 & \text{if } IC_g = 0 \\ IC_g \cdot \dfrac{RRSV_{l,g}}{\sum_{m \in L_g} RRSV_{m,g}} & \text{if } \sum_{m \in L_g} RRSV_{m,g} > IC_g > 0, \\ RRSV_{l,g} & \text{otherwise} \end{cases}$$

Step 4. The reservation $RSV_g$ on circuit group g is then computed as:

$$RSV_g = \sum_{m \in L_g} RSV_{m,g}$$

The number of safe idle circuits $SIC_l$ would then be computed as described above.

This second distribution algorithm is preferred because it dispenses with the proportion $P_{l,g}$, which could be frequently updated without the knowledge of the network processor means (as will be shown in section 3.2).

3.0 Management of virtual destination node intra-link traffic using dynamically-updated proportions In the embodiment described above with reference to FIGS. 2 through 4, the proportions listed in Table II are "fixed", i.e. computed "off-line" and stored in the storage means of the switch under manual control. They are not modified automatically and in "near real-time" like the stored alternative routing data. It is envisaged, however, that improvements in grade of service, particularly in times of stress, could be attained by modifying the system to allow dynamic updating of the proportions also. For convenience, the ensuing description will refer to virtual destination nodes for which the proportions can be updated dynamically as "dynamic virtual destination nodes" and attribute to them various actions which, in reality, will be performed by their components. Hence, in FIGS. 5 and 6, nodes U and W are "dynamic virtual destination nodes".

Dynamic updating of the proportions can be centralized or distributed. In the centralized case, a common central processor, conveniently the network processor 25A, uses information sent to it by the switches to compute the proportions and then sends the new proportions to the appropriate switches. In the distributed case, the individual switches update their own proportions based upon information they have collected about call completion rates.

Figure 5:
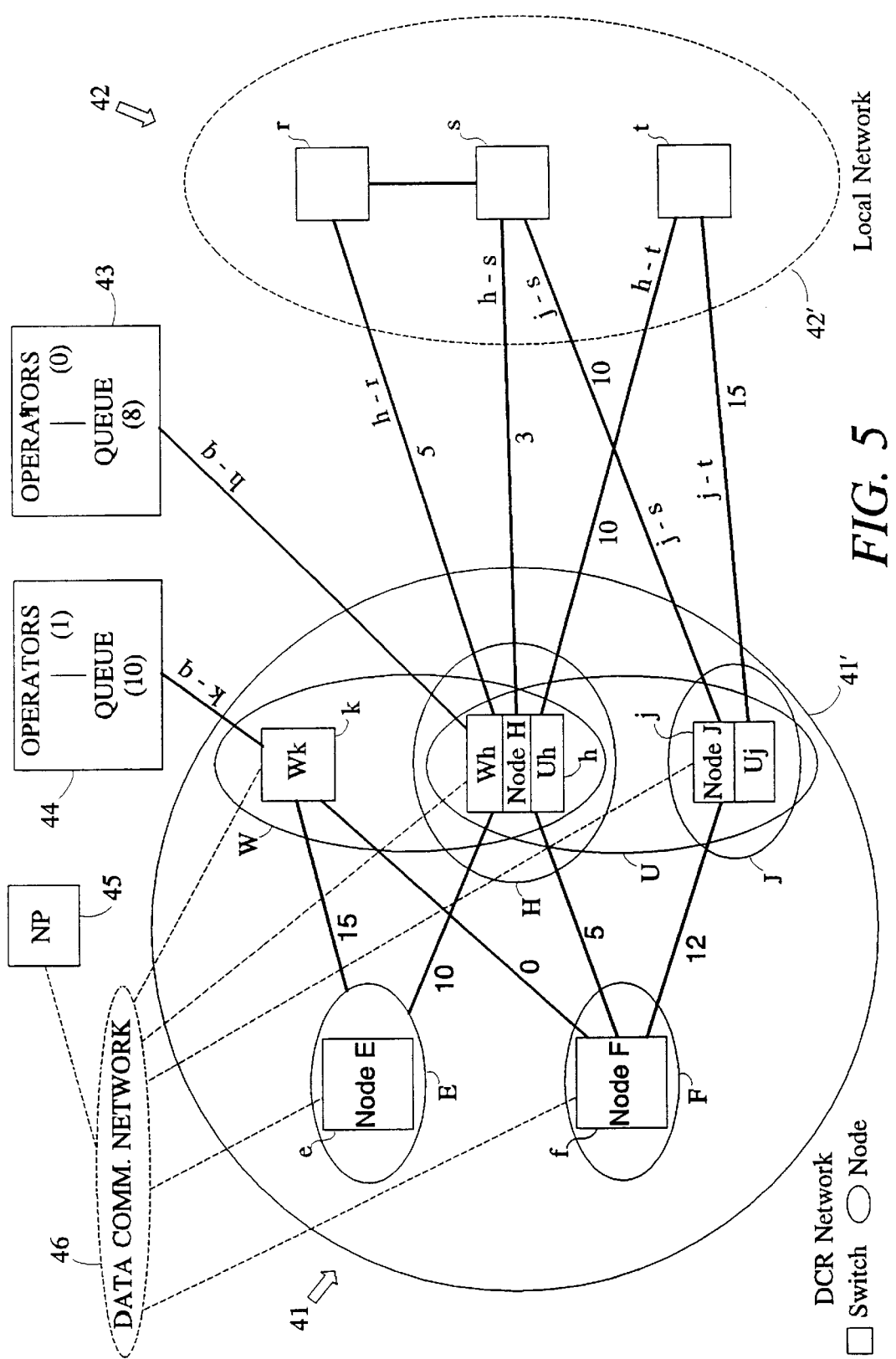
FIG. 5 illustrates a second embodiment of the invention in which the network processor controls traffic allocation between components of a virtual destination node.
Figure 6:
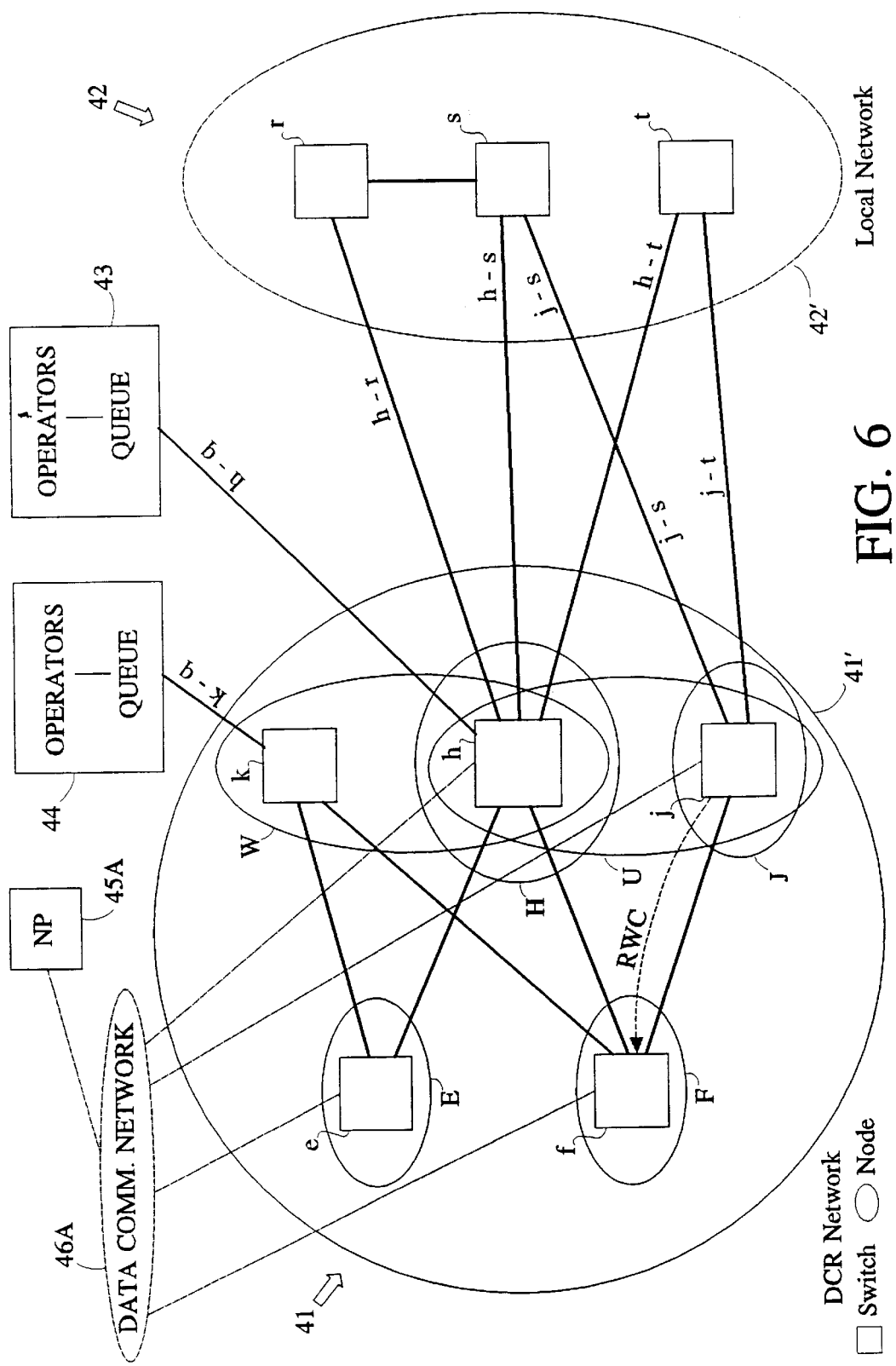
FIG. 6 illustrates a third embodiment of the invention in which traffic allocation between components of a virtual destination node is controlled by the switching elements.

Both centralized and distributed computation of the proportions will now be described with reference to FIGS. 5 and 6. FIGS. 5 and 6 illustrate a DCR network 41 comprising five switches e, f, h, j and k, each represented by a square. The DCR network 41 has six nodes E, F, H, J, U and W, each represented by an ellipse. It should be noted that, in FIG. 5, the labels inside the squares represent the roles which the switches play, i.e. as an individual node or as a component of a virtual destination node.

Dynamic virtual destination node U is used to transfer calls from the DCR network 41 to a local area network 42, which comprises three switches r, s and t connected to switches h and j by circuit groups h-r, h-s, h-t, j-s and j-t. Dynamic virtual destination node U has two components Uh and Uj, residing in switches h and j, respectively.

Dynamic virtual destination node W is used to reach operator services, for example TOPS operator stations 43 and 44 connected to switches h and k by circuit groups h-q and k-q, respectively. Dynamic virtual destination node W has two components, residing in switches h and k, respectively.

It should be noted that the data communications network 46 may need to be extended, as compared with the data communications network 24A of FIGS. 2 and 3, to support the new communicating entities and to allow for the gathering of the completion capability from each of the components Ug, Uh, Wg and Wj.

3.1 Centralized Computation of Proportions

In order for the network processor to compute the proportions, it needs to receive information about the components of the virtual destination nodes, i.e. status of their associated circuit groups and traffic volumes. It should be appreciated that the virtual destination nodes are logical entities and so cannot physically communicate with the network processor 45. Instead each component of a dynamic virtual destination node communicates the required information on behalf of the virtual destination node. The network processor gathers information from the components of each dynamic virtual destination node and "labels" it as information from that dynamic virtual destination node.

The same physical element can belong to several dynamic virtual destination nodes. One distinct component is associated with each one of them. Therefore, a single physical element may act as several distinct components, each reporting distinct (and possibly unrelated) information. Furthermore, the same physical element can also act as an origin node and therefore may also report other information (unrelated to its component role). In a reporting period, the switching element which represents a normal node may communicate first in its own behalf, and then report on behalf of the virtual destination node. Thus, in DCR network 41, switches e and f act solely as nodes E and F, respectively, and switch k acts solely as a component of virtual destination node W. Switches h and j, however, play multiple roles. Switch j has two roles; it acts as node J and as a component of dynamic virtual destination node U. Switch h has three roles: it acts as (i) node H; (ii) a component of dynamic virtual destination node W; and (iii) a component of dynamic virtual destination node U. Hence, when communicating with the network processor 45, switch j will communicate twice; once as node J and again on behalf of virtual destination node U. Switch h will communicate three times; once as node H; a second time on behalf of virtual destination node W; and a third time on behalf of virtual destination node U. It should be appreciated that, even though these multiple communications am logically distinct, they could in fact be aggregated into a single message to the NP 45 for efficiency reasons.

3.1.1 Monitoring of the Nodes and Components

As previously described, the status of each origin node and its circuit groups is measured by the switch that acts as the origin node in the network and comprises the following information:

Number of idle circuits in each circuit group.

Total number of circuits in each circuit group.

Other information relevant to DCR and virtual destination nodes but not used directly by the dynamic virtual destination nodes of this embodiment of the present invention.

This information is reported to the network processor 45 at regular intervals as previously described.

As mentioned previously, from the perspective of the NP 45, each node and each component is a different logical entity. Communication between the NP 45 and each entity is considered independently by the NP 45. Thus, in the embodiment of FIG. 5, the NP 45 for the DCR network 41 would maintain eight communications sessions with the eight entities of the network: origin nodes E, F, H and J, components Ug and Uh of dynamic virtual destination node U, and components Wg and Wj of dynamic virtual destination node W.

The control process for dynamic intra-link traffic allocation among the circuit groups of the links to the virtual destination nodes U and W comprises the following six main subprocesses, some of which are common to the first embodiment of the invention:

1. The measuring of the real-time ability of each component of the virtual destination node to complete calls once they have reached it. This is done by the components of the dynamic virtual destination node, and takes into account only calls that are associated with the dynamic virtual destination node.

2. The measuring of the real-time status of the nodes and their circuit groups. This is done by the switches that act as origin nodes, namely e, f, h and j.

3. The gathering of this information by the network processor 45 via the communications network 46 between the switches and the network processor 45.

4. The computation by the network processor 45 of the proportions to use for intra-link traffic distribution for each link to a dynamic virtual destination node.

5. The communication of these proportions to the origin nodes via the communication network (46) between the network processor 45 and the swishes of the origin nodes.

6. The application of these proportions for intra-link traffic distribution. This is done by the switches that act as origin nodes, namely e, f, h and j, updating their respective tables (Table II), by substituting new proportions for old ones, These subprocesses are repeated at regular time intervals, conveniently at the same time as normal routing information transfers.

3.1.2 Monitoring of Component Status

The status of each of the components Uh, Uj, Wh and Wk of the dynamic virtual destination nodes, i.e. its ability to complete calls, is computed by the component itself using a measure called the "completion capability". This is a measure based upon the idle capacity from the component to the corresponding final destination outside the DCR network (in local network 42 or TOPS stations 43 and 44 in the specific embodiment) and reflects the ability of the component to complete calls once they have reached it. This measure takes into account only calls that are associated with the corresponding dynamic virtual destination node.

Depending upon the particular type of dynamic virtual destination node (its network "meaning"), the precise definition of the completion capability of a component can be different. Thus, completion capability of the components Ug and Uh to final destinations in the local network 42 will not be defined in the same way as the completion capability of components Wg and Wj to the operator stations 43 and 44, since the calls are not sent to the same destination and the traffic and call characteristics will be different. Each specific application of the dynamic virtual destination node requires that a specific completion capability measure be defined. Even though the data to be reported may be very different from one application to another, the following rules will be followed for defining the completion capability:

Each component should report a measure expressed as a single integer number greater than or equal to 0.

The measure should indicate the absolute completion capability of the component. Relative completion capability (the ratio of the idle capacity to the total capacity) should be avoided.

The measure should be strictly monotone increasing (the more idle capacity there is, the larger the number should be).

Furthermore, the measure should be as close as possible to a linear function.

0 (zero) should be reported if and only if there is no more idle capacity, i.e. if all calls will be rejected by the component (while in the current state).

The measures reported by the components of a given dynamic virtual destination node should be directly comparable with each other. This is not necessary between components of different dynamic virtual destination nodes.

Thus, for the components of virtual destination node U, the completion capability measure could be defined as the total number of idle circuits from the components Ug and Uh to the local network 42. Hence, the completion capability of the component Uh of node U residing at switch h would be 18 (which is 5+3+10, the number of circuits in circuit groups h-r, h-s and h-t). The completion capability of the component Uj of node U residing at switch j would be 25 (which is 10+15, the number of circuits in circuit groups j-s and j-t).

For each of the components Wh and Wk of virtual destination node W, the completion capability measure could be defined as a combination of the remaining capacity of the queue for calls awaiting service and of the number of idle operators. In this case, more weight should be given to the number of idle operators to reduce waiting times. The measure could be defined as ten times the number of idle operators plus the remaining capacity of the queue. For example, if station 44 has one operator idle and a remaining queue capacity for 10 calls, the completion capability of the component Wk residing at switch k would be 20 (which is 10·1+10). Likewise, if station 43 has no operators idle and a remaining queue capacity for eight calls, the completion capability of the component Wh of node W residing at switch h would be 8 (which is 10·0+8).

3.1.3 Computation of the Proportions by the Central Processor

It should be appreciated that, for each link to a dynamic virtual destination node, the network processor 45 computes a proportion for each of the circuit groups of the link. The following information, provided by the origin nodes and components of the dynamic virtual destination nodes (see the previous steps), is required to perform these computations:

$CC_c$ The completion capability reported by component c.

$C_{l,g}$ The component of a dynamic virtual destination node to which circuit group g in link l goes.

$G_l$ The set of the circuit groups of link l.

$IC_g$ The reported number of idle circuits on circuit group g.

$L_g$ The set of the links that contain circuit group g.

$P_{l,g}$ The proportion currently used for circuit group g in link l.

PWF The weighting factor used for the computation of the proportions.

The weighting factor PWF is set by the user to control the reactiveness of the system. An appropriate value for PWF is 0.45.

The computations are done in five steps, which are described in the following sections 3.1.3.1. to 3.1.3.5.

3.1.3.1 Weights Based on Circuit Group Idleness

The first step is to compute, for each circuit group of each link to each dynamic virtual destination node, a weight based on its number of idle circuits. The first weight $W1_g$ for circuit group g is computed as:

$$WI_g = \frac{IC_g}{\#L_g}$$

where $\#L_g$ is the number of links that contain circuit group g.
In the example of FIG. 5, the following values are computed:

$$WI_{e-h} = \frac{10}{\#\{E-H, E-U, E-W, H-E\}} = 2.5$$

$$WI_{e-k} = \frac{15}{\#\{E-W\}} = 15$$

$$WI_{f-h} = \frac{5}{\#\{F-H, F-U, F-W, H-F\}} = 1.25$$

$$WI_{f-j} = \frac{12}{\#\{F-J, F-U, U-F\}} = 4$$

$$WI_{f-k} = \frac{0}{\#\{F-W\}} = 0$$

3.1.3.2 Weights Based on Component Completion Capability

The second step involves computing, for each circuit group of each link to each dynamic virtual destination node, a weight based on the completion capability of the components of the dynamic virtual destination node. This second weight $W2_{l,g}$ for circuit group g of link l is computed as:

$$W2_{l,g} = CC_{C_{l,g}} \cdot \frac{WI_g}{\sum_{i|C_{l,i}=C_{l,g}} WI_i}$$

When the denominator in the above formula is zero, the following formula can be used instead:

$$W2_{l,g} = CC_{C_{l,g}} \cdot \frac{1}{\#\{i \mid C_{l,i} = C_{l,g}\}}$$

where $\#\{i|C_{l,i}=C_{l,g}\}$ is the number of circuit groups in link l that connect to the same component as circuit group g.
In the example of FIG. 5, the following values are computed:

$$W2_{E-U,e-h} = 18 \cdot \frac{2.5}{2.5} = 18$$

$$W2_{E-W,e-h} = 8 \cdot \frac{2.5}{2.5} = 8$$

$$W2_{E-W,e-k} = 20 \cdot \frac{15}{15} = 20$$

$$W2_{F-U,f-h} = 18 \cdot \frac{1.25}{1.25} = 18$$

$$W2_{F-U,f-j} = 25 \cdot \frac{4}{4} = 25$$

$$W2_{F-W,f-h} = 8 \cdot \frac{1.25}{1.25} = 8$$

$$W2_{F-W,f-k} = 20 \cdot \frac{1}{\#\{f-k\}} = 20 \text{ because } \sum_{i|C_{F-W,i}=k} WI_i = 0$$

3.1.3.3 Combined Weights

The third step combines the first and second weights obtained earlier. The combined weight $W_{l,g}$ for circuit group g of link l is computed as:

$$W_{l,g} = \sqrt{WI_g \cdot W2_{l,g}}$$

In the example of FIG. 5, the following values are computed:

$$W_{E-U,e-h} = \sqrt{2.5 \cdot 18} = 6.708$$

$$W_{E-W,e-h} = \sqrt{2.5 \cdot 8} = 4.472$$

$$W_{E-W,e-k} = \sqrt{15 \cdot 20} = 17.32$$

$$W_{F-U,f-h} = \sqrt{1.25 \cdot 18} = 4.743$$

$$W_{F-U,f-j} = \sqrt{4 \cdot 25} = 10$$

$$W_{F-W,f-h} = \sqrt{1.25 \cdot 8} = 3.162$$

$$W_{F-W,f-k} = \sqrt{0 \cdot 20} = 0$$

3.1.3.4 Proportions

The fourth step transforms the combined weights into proportions. The proportion $WP_{l,g}$ for circuit group g of link l is computed as:

$$WP_{l,g} = \frac{W_{l,g}}{\sum_{i \in G_l} W_{l,i}}$$

When the denominator in the above formula is zero, the following formula can be used instead:

$$WP_{l,g} = \frac{1}{\#G_l}$$

where $\#G_l$ is the number of circuit groups in link l.
In the example of FIG. 5, the following values are computed:

$$WP_{E-U,e-h} = \frac{6.708}{6.708} = 1$$

$$WP_{E-W,e-h} = \frac{4.472}{4.472 + 17.32} = 0.2052$$

$$WP_{E-W,e-k} = \frac{17.32}{4.472 + 17.32} = 0.7949$$

$$WP_{F-U,f-h} = \frac{4.743}{4.743 + 10} = 0.3218$$

$$WP_{F-U,f-j} = \frac{10}{4.743 + 10} = 0.6784$$

$$WP_{F-W,f-h} = \frac{3.162}{3.162 + 0} = 1$$

$$WP_{F-W,f-k} = \frac{0}{3.162 + 0} = 0$$

3.1.3.5 Proportions Updated and Sent to the Origin Node

Finally, the proportions obtained in the previous step are combined with the proportions used in the previous cycle to obtain the proportions that will be sent to the origin node. The proportion $P_{l,g}$ for circuit group g of link l is computed as:

$$P_{l,g} = WP_{l,g} \cdot PWF + P'_{l,g} \cdot (1-PWF),$$

where $P'_{l,g}$ is the proportion for circuit group g in link l before the update, i.e. in the previous cycle.

In the example of FIG. 5, the following values are computed, assuming that PWF is 0.45 and that all $P'_{l,g}$ are 50% (except $P'_{E-U,e-h}$ which must be 100%)

$$P_{E-U,e-h} = 1 \cdot 0.45 + 100\% \cdot (1-0.45) = 100.0\%$$

$$P_{E-W,e-h} = 0.2052 \cdot 0.45 + 50\% \cdot (1-0.45) = 36.73\%$$

$$P_{E-W,e-k} = 0.7949 \cdot 0.45 + 50\% \cdot (1-0.45) = 63.27\%$$

$$P_{F-U,f-h} = 0.3218 \cdot 0.45 + 50\% \cdot (1-0.45) = 41.98\%$$

$$P_{F-U,f-j} = 0.6784 \cdot 0.45 + 50\% \cdot (1-0.45) = 58.03\%$$

$$P_{F-W,f-h} = 1 \cdot 0.45 = 50\% \cdot (1-0.45) = 72.50\%$$

$$P_{F-W,F-k} = 0 \cdot 0.45 + 50\% \cdot (1-0.45) = 27.50\%$$

3.1.4 Communicating of the Proportions to the Origin Nodes

The network processor communicates the proportions to the origin nodes via the data communication network 46 periodically, conveniently at the same time as the periodic alternate route updates.

3.1.5 Application of the Proportions

When an origin node receives from the NP new proportions for a link, it has to implement them. This is done by updating the proportions in the main DCR table to the new values received. This is the same table of proportions (Table II) used in the embodiment described with respect to FIGS. 2 to 4 but, in that embodiment, the proportions were static.

It should be appreciated that, although it is convenient for the network processor to compute the proportions and send them to the switching elements along with the usual routing information updates, a separate processor could be used for the proportions and be part of the network processor means.

3.2 Distributed Computation of Proportions

Updating of the proportions automatically to keep them optimal does not necessarily require communication of additional information between a central processor, the switches of the network, and the components of the virtual nodes. Indeed, it is possible to define other methods for achieving the same goal that do not involve a central processor at all. In the alternative procedure described hereafter, the additional information for updating the proportions dynamically is obtained by monitoring overflow calls and existing signalling messages (standard CCS7 messages), and this information is processed directly by the switches. The signalling messages monitored by the switches for this purpose are called Release With Cause (RWC) messages. Such a message is sent whenever a call cannot be completed. A specific field in this message indicates the cause for the non-completion. It is possible, therefore, for a switching element to determine whether or not its attempt of a circuit group inside a link has been successful. Indeed, the attempt can be considered successful unless:

The call has overflowed the circuit group (all its circuits were busy), OR

The call has been carried by the circuit group, but has returned with a Release With Cause message indicating that it was blocked.

When such events occur, it is possible for the switching element to update the proportions for the link, in order to optimize the throughput of call routing. The following subsection 3.2.1 describes the details of this scheme.

FIG. 6 differs from FIG. 5 because such automatic update of proportions by the individual switching elements entails changes to the DCR network. Thus, in the network of FIG. 6, there is no data link between data communications network 46A and switch k, because the latter does not communicate on behalf of virtual destination node W. Also, broken line RWC from switch j to switch f indicates that switch f monitors Release With Cause messages and overflows for calls it has attempted to route to virtual destination node U (of which switch j is a component). The network processor 45A in FIG. 6 also differs from that of FIG. 5 because it does not compute proportions and it not longer has communication sessions with components Uh, Uj, Wh and Wk of the virtual destination nodes U and W. Thus, the network processor 45A maintains only one communication session with switch h, rather than three; only one communication session with switch j, rather than two; and no communication session with switch k, rather than one.

3.2.1 Automatic Update of the Proportions

In order to update the proportions dynamically, each switch keeps, for each of its multi-circuit-group links, the following variables:

N: the number of circuit groups in the link (2 or more).

LASTCG: the index in the link of the last circuit group that had an overflow or Release With Cause message (1 to N).

LASTOVF: the number of overflows and/or Release With Cause messages in a row for the circuit group LASTCG (1 or more).

CGCTR: the index in the link of the last circuit group that had its proportion updated (1 to N).

When an attempt to route a call using a circuit group CG in a link to a dynamic virtual destination node results in an overflow or a Release With Cause (RWC) message specifying one of a predetermined set of causes, the switch makes the following modifications to the proportions: p1 1. If the index of circuit group CG is LASTCG then add 1 to LASTOVF; otherwise set LASTCG to the index of circuit group CG and set LASTOVF to 1.

2. If the update is due to an overflow then:
 (a) Set MAXDEC to the minimum of LASTOVF% and the current proportion of circuit group CG.
 otherwise (the update is due to a Release With Cause message):
 (b) Set MAXDEC to the minimum of (LASTOVF% multiplied by N) and the current proportion of circuit group CG.

3. Subtract MAXDEC from the current proportion of circuit group CG.

4. Repeat MAXDEC times:
 (a) Add 1 to CGCTR; if CGCTR>N then set CGCTR to 1.
 (b) If CGCTR=LASTCG then go back to step 4a.
 (c) Add 1% to the current proportion of the circuit group with index CGCTR.

This algorithm ensures that the total of the proportions of the circuit groups in the link remains 100% at all times.

An example will now be described with reference to FIG. 6. In this example, link F-U is composed of two circuit groups; f-h (index 1), and f-j (index 2). Assume that the current proportions for link F-U are 40% for circuit group f-h and 60% for circuit group f-j. Assume also that, for the link F-U, the current value of LASTCG is 2, the current value of LASTOVF is 2, and the current value of CGCTR is 1.

Consider a call originating at switch f and destined for the local network 42. Such a call is translated at switch f as being associated with destination node U. The routing then proceeds to node U. The first step for switch f is to attempt the direct link to U, which is done using the distribution algorithm described in section 2.2

Assume that within link F-U, the circuit group f-j is selected as the first circuit group to attempt for this call (this would happen with 60% probability). Switch f sends the call to switch j using circuit group f-j. However, once at switch j, assume that the call is not able to complete because all appropriate circuits outgoing from switch j are busy. At this point, switch j generates a Release With Cause message indicating the reason why the call was blocked and sends it to switch f.

Once received by switch f, this RWC message triggers the execution of the above algorithm. Since the call was being sent to node U, switch f uses the data for link F-U. Since the index of the "faulty" circuit group f-j, which is 2, is equal to LASTCG, the first step increments LASTOVF by 1, which changes it to 3.

Since the update is due to a Release With Cause message, step 2 sets MAXDEC to the minimum of 3%*2 and 60%, which is 6%.

Step 3 then decreases the current proportion of circuit group f-j by 6%, which makes it 54%.

Finally, step 4 redistributes this 6% across all other circuit groups of the link. Since in this case there is only one other circuit group, it receives the entire 6% increment. Therefore, the proportion for circuit group f-h now becomes 46%.

The above algorithm gives more weight to RWC messages than to overflows (through step 2). Alternatively, the entire step 2 of the above algorithm could be changed to:

2. Set MAXDEC to the minimum of LASTOVF% and the current proportion of circuit group CG.

It should be appreciated that the alternative procedure described in section 3.2, using distributed computation of proportions, is simpler than that of section 3.1 and may yield cost savings because the switches do not need to communicate with the network processor means in connection with the updating of the proportions.

Industrial Applicability

Embodiments of the invention employ a virtual destination node to provide improved egress from the DCR network, as compared with networks in which calls must exit via a single switch. It is envisaged that virtual destination nodes will be employed in other ways and for other purposes. It is also envisaged that the invention could be used in telecommunications networks which do not use dynamic routing.

Although embodiments of the invention have been described and illustrated in detail, it is to be clearly understood that they are by way of illustration and example only and not to be taken by way of limitation, the spirit and scope of the present invention being limited only by the appended claims.

We claim:

1. A telecommunications network (31A) comprising:
   a plurality of network nodes (A,B,C,O,T,V) and links (A-B,A-O,A-T,B-A,B-O,B-T, . . . ), the network nodes comprising origin nodes (A,B,C,O,T), each comprising a switching element (a,b,c,o,t) capable of routing calls within the network, and destination nodes (A,B,C,O,T, V) serving as destinations for such calls, some of said network nodes being transit nodes (A,B,C,O,T), each transit node being both a destination node and an origin node;
   each link interconnecting directly an origin node and a destination node and comprising one or more circuit groups (a-b,o-a,o-b,o-c, . . . ),
   each of the switching elements having storage means for routing information, the routing information comprising
   (i) a listing of destination nodes;
   (ii) associated with each destination node, a corresponding link, where such a link exists;
   (iii) for each link, a corresponding group of one or more circuit groups outgoing from the switching element; and
   (iv) associated with each destination node, a list of zero or more transit nodes;
   each switching element comprising means for translating address data of a call to determine a destination node for the call and
   (i) where a link to the destination node exists, attempting to route the call to the destination node via a circuit group that is in the link;
   (ii) where a link to the destination node is not available, accessing its routing information to select a transit node and attempting to route the call via a circuit group that is in the link to the transit node;
   wherein said listing of destination nodes of at least one of said switching elements, said one of said switching elements being at one of said origin nodes, comprises a virtual destination node (V) representing a group of two or more components (a,b,c), each component being a distinct physical network element, there being one or more distinct circuit groups associated with each component, and the link from said one of said origin nodes to the virtual destination node is a set of circuit groups from the switching element at that one of said origin nodes to the two or more components of the virtual destination node; said link from said one of said origin nodes to the virtual destination node comprises a plurality of circuit groups, the storage means of said one of said switching elements includes a specified proportion for each of those circuit groups and, when attempting to route a call via said link from said one of said origin nodes to the virtual destination node, said one of said switching elements attempts the circuit groups in dependence upon the specified proportions; and said one of said switching elements is arranged, in attempting to route a call via said link to the virtual destination node, to:
   (i) determine the set S of all circuit groups with a non-zero proportion in said plurality of circuit groups;
   (ii) determine whether or not the set S is empty;
   (iii) cause the call to overflow if the set is empty;
   (iv) if the set is not empty, make a weighted random selection of one of the circuit groups of the set S, and attempt to route the call via such circuit group;
   (v) if the selected circuit group does not have a circuit idle, remove the selected circuit group from the set S; and
   (vi) repeat steps (ii) through (v) until the call is carried or all circuit groups in the set have been exhausted and the call overflowed.

2. A network as claimed in claim 1, further comprising network processor means (25A) for updating the routing information, the network processor means being coupled to all of said switching elements by a data communications network (24A) whereby, periodically, each of said switching elements communicates to the network processor means information about network conditions local to the switching element and receives from the network processor means alternate routing information including recommended transit nodes, the network processor means computing alternate routing information in dependence upon the information communicated thereto by all of the switching elements and periodically updating the information identifying transit nodes.

3. A network as claimed in claim 2, wherein, when computing alternate route recommendations, the network processor means takes into account full availability of all of the links and, where a link comprises a plurality of circuit groups, takes into account all of the circuit groups of that link.

4. A network as claimed in claim 3, wherein the network processor means is arranged to determine safe idle circuits for said links by:

(i) storing for each link a protective allowance previously computed for that link, the protective allowance preserving capacity in the link for direct traffic;

(ii) computing, from these protective allowances and from current link utilization, a reservation value for each circuit group of each link;

(iii) computing, from these reservation values and from the number of idle circuits reported by switching elements of origin nodes, the number of unreserved (safe) idle circuits on each link;

and further arranged to compute, based on these numbers of safe idle circuits, transit node recommendations for each pair of an origin node and a destination node connected directly by a link from the origin node to the destination node.

5. A network as claimed in claim 4, wherein said link from said one of said origin nodes to the virtual destination node comprises a plurality of circuit groups and the respective storage means of said switching elements each include a specified proportion for each of said circuit groups within each link and, when attempting to route a call via one of such links, the switching element attempts the circuit groups of the link in dependence upon the specified proportions, and wherein the network processor means is arranged to:

(i) distribute the protective allowances of the links that contain circuit group g among their circuit groups such that the reservation $RSV_g$ on circuit group g is equal to $$RSV_g = \min\left(\sum_{m \in L_g} P_{m,g} \cdot PA_m, IC_g\right)$$

producing a total reservation level $RSV_1$ for link l equal to:

$$RSV_1 = \sum_{g \in G_l} RSV_g$$

and:

(ii) compute the number of idle circuits $IC_1$ as $$IC_l = \sum_{g \in G_l} IC_g$$

and the number of safe idle circuits $SIC_1$ link l as:

$$SIC_1 = IC_1 - RSV_1$$

where $G_1$ is the set of circuit groups of link l;

$IC_g$ is the reported number of idle circuits on circuit group g;

$L_g$ is the set of the links that contain circuit group g;

$P_{l,g}$ is said proportion used for intra-link traffic distribution for circuit group g of link l;

$PA_1$ is the protective allowance value for link l, serving to preserve capacity for direct traffic.

6. A network as claimed in claim 4, wherein the network processor means is arranged to:

(i) store the current reservation $RSV_{l,g}$ for each circuit group of each link; and (ii) when computing the safe idle circuits;

(A) when the current $RSV_{l,g}$ is 0, adjust such reservation $RSV_{l,g}$ to become:

$$RSV_{l,g} = \min\left(\frac{IC_g}{\#L_g}, \frac{PA_l}{\#G_l}\right)$$

(B) compute the requested reservation $RRSV_{l,g}$ using the formula:

$$RRSV_{l,g} = \begin{cases} PA_l \cdot \dfrac{RSV_{l,g}}{\sum\limits_{h \in G_l} RSV_{l,h}} & \text{if } \sum\limits_{h \in G_l} RSV_{l,h} > 0 \\ PA_l \cdot \dfrac{1}{\#G_l} & \text{otherwise} \end{cases}$$

(C) compute the new reservation $RSV_{l,g}$ on circuit group g for link l as:

$$RSV_{l,g} = \begin{cases} 0 & \text{if } IC_g = 0 \\ IC_g \cdot \dfrac{RRSV_{l,g}}{\sum\limits_{m \in L_g} RRSV_{m,g}} & \text{if } \sum\limits_{m \in L_g} RRSV_{m,g} > IC_g > 0, \\ RRSV_{l,g} & \text{otherwise} \end{cases}$$

(D) compute the reservation $RSV_g$ on circuit group g as:

$$RSV_g = \sum_{m \in L_g} RSV_{m,g}$$

(E) compute the number of idle circuits $IC_1$ for each link l as:

$$IC_l = \sum_{g \in G_l} IC_g$$

(F) compute the number of safe idle circuits $SIC_1$ for link l as equal to:

$$SIC_1 = IC_1 - RSV_1$$

where:

$G_1$ is the set of circuit groups of link l;

$\#G_1$ is the number of circuit groups in link l;

$IC_g$ is the reported number of idle circuits on circuit group g;

$L_g$ is the set of the links that contain circuit group g; and $PA_1$ is the protective allowance value for link l, serving to preserve capacity for direct traffic.

7. A network as claimed in claim 1, further comprising means for updating the proportions automatically to take account of current link utilization and current ability of said components of said virtual destination node to complete calls to the final destinations served by that virtual destination node.

8. A network as claimed in claim 1, further comprising network processor means (25A) coupled to all of said switching elements by a data communications network (24A) whereby, periodically, each of said switching elements communicates to the network processor means information about network conditions local to the switching element and receives from the network processor means alternate routing information including recommended transit nodes, the network processor means computing alternate routing information in dependence upon the information communicated thereto by all of the switching elements and periodically updating the information identifying transit nodes, the network processor means further comprising means for updating the proportions automatically to take account of current link utilization and current ability of said components of said virtual destination node to complete calls to the final destinations served by that virtual destination node, wherein each of said components of said virtual destination node is arranged to report to the network processor means call completion capability information related to its ability to complete calls to the final destinations served by that virtual destination node, and the network processor means is arranged to compute a proportion for each circuit group of said link to said virtual destination node based upon such call completion information, and upon said network conditions reported by said switching elements, and to supply those proportions to the switching element at the origin node connected to said virtual destination node by said link.

9. A network as claimed in claim 8, wherein the call completion capability information communicated to the network processor means is rendered in a similar form and treated in a similar manner by the network processor means regardless of differences between the components, characteristics of calls handled, and final destinations served by those components.

10. A network as claimed in claim 8, wherein the network processor is arranged to determine the proportions such that traffic is distributed among the plurality of circuit groups of said link to the virtual destination node in accordance with idle capacity of the circuit groups of said link and call completion capability of said components of said virtual destination node.

11. A network as claimed in claim 10, wherein the network processor is arranged to compute, for each circuit group of said link to said virtual destination node, a first weight based on its number of idle circuits, and a second weight based on the completion capability of the components of the dynamic virtual destination node, to combine the first and second weights, to transform the combined weights into proportions, to combine the proportions resulting from such transformation with corresponding proportions used previously, and to send to said switching element at said one of said origin nodes the proportions resulting from such combination, said switching element being arranged to update its said storage means with the newly-computed proportions for subsequent use in distributing calls among the circuit groups of said link to said virtual destination node.

12. A network as claimed in claim 11, wherein the network processor means is arranged to compute:

the first weight $W1_g$ for circuit group g as:

$$W1_g = \frac{IC_g}{\#L_g}$$

the second weight $W2_{l,g}$ for circuit group g of link l as:

$$W2_{l,g} = \begin{cases} CC_{C_{l,g}} \cdot \dfrac{W1_g}{\sum\limits_{i|C_{l,i}=C_{l,g}} W1_i} & \text{if } \sum\limits_{i|C_{l,i}=C_{l,g}} W1_i \neq 0 \\ CC_{C_{l,g}} \cdot \dfrac{1}{\#\{i \mid C_{l,i} = C_{l,g}\}} & \text{otherwise} \end{cases}$$

the combined weight $W_{l,g}$ for circuit group g of link l as:

$$W_{l,g} = \sqrt{W1_g \cdot W2_{l,g}}$$

the proportion $WP_{l,g}$ for circuit group g of link l as:

$$WP_{l,g} = \begin{cases} \dfrac{W_{l,g}}{\sum\limits_{i \in G_l} W_{l,i}} & \text{if } \sum\limits_{i \in G_l} W_{l,i} \neq 0 \\ \dfrac{1}{\#G_l} & \text{otherwise} \end{cases}$$

and:

the combined proportion $P_{l,g}$ for circuit group g of link l, combining the instant proportion and the previous proportion, as:

$$P_{l,g} = WP_{l,g} \cdot PWF + P'_{l,g} \cdot (1-PWF),$$

where $CC_o$ is the completion capability reported by component c;

$C_{l,g}$ is the component of a dynamic virtual destination node to which circuit group g in link l goes;

$G_l$ is the set of the circuit groups of link l;

$\#G_l$ is the number of circuit groups in link l;

$IC_g$ is the reported number of idle circuits on circuit group g;

$\#L_g$ is the number of links that contain circuit group g;

$P'_{l,g}$ is the previous proportion for circuit group g in link l; and

PWF is the weighting factor used for the computation of the proportions.

13. A network as claimed in claim 7, wherein each switching element derives call completion rate information for its calls to said virtual destination node and updates its proportions independence thereupon.

14. A network as claimed in claim 13, wherein said switching element, when attempting to route a call using said link to said virtual destination node, derives said call completion information by monitoring circuit group overflows and Release With Cause signalling messages attributable to factors remediable by the network.

15. A network as claimed in claim 14, wherein said one of said switching elements keeps for said link to said virtual destination node the variables:

N: the number of circuit groups in the link (2 or more).

LASTCG: the index in the link of the last circuit group that had an overflow or Release With Cause message (1 to N).

LASTOVF: the number of overflows and/or Release With Cause messages in a row for the circuit group with index LASTCG (1 or more).

CGCTR: the index in the link of the last circuit group that had its proportion updated (1 to N); and when an attempt by said one of said switching elements to route a call using a circuit group CG in said link to said virtual destination node results in an overflow or a Release With Cause message specifying one of a predetermined set of causes, the switching element modifies the proportions for that link as follows:

1. If the index of circuit group CG is LASTCG then add 1 to LASTOVF; otherwise set LASTCG to the index of circuit group CG and set LASTOVF to 1.
2. If the update is due to an overflow then:
   (a) Set MAXDEC to the minimum of LASTOVF% and the current proportion of circuit group CG.
   Otherwise (the update is due to a Release With Cause message):
   (b) Set MAXDEC to the minimum of (LASTOVF% multiplied by N) and the current proportion of circuit group CG.
3. Subtract MAXDEC from the current proportion of circuit group CG.
4. Repeat MAXDEC times:
   (a) Add 1 to CGCTR; if CGCTR>N then set CGCTR to 1.
   (b) if CGCTR=LASTCG then go back to step 4a.
   (c) Add 1% to the current proportion of the circuit group with index CGCTR.

16. A method of routing calls in a telecommunications network (31A) such network comprising:

a plurality of network nodes (A,B,C,O,T,V) and links (A-B,A-O,A-T,B-A,B-O,B-T, . . . ), the network nodes comprising origin nodes (A,B,C,O,T), each comprising a switching element (a,b,c,o,t) capable of routing calls within the network, and destination nodes (A,B,C,O,T, V) serving as destinations for such calls, some of said network nodes being transit nodes (A,B,C,O,T), each transit node being both a destination node and an origin node;

each link interconnecting directly an origin node and a destination node and comprising one or more circuit groups (a-b,o-a,o-b,o-c, . . . ), each of the switching elements having storage means for routing information, the routing information comprising
   (i) a listing of destination nodes;
   (ii) associated with each destination node, a corresponding link, where such a link exists;
   (iii) for each link, a corresponding group of one or more circuit groups outgoing from the switching element; and
   (iv) associated with each destination node, a list of zero or more transit nodes;

said listing of destination nodes of at least one of said switching elements that is at one of said origin nodes comprising a virtual destination node (V) representing a group of two or more components (a,b,c), each component being a distinct physical network element, there being one or more distinct circuit groups associated with each component, the link from said one of said origin nodes to the virtual destination node being a set of circuit groups from said one of said switching elements to the two or more components of the virtual destination node, and the storage means of said one of said switching elements including a specified proportion for each of those circuit groups;

each switching element comprising means for translating address data of a call to determine a destination node for the call;

the method comprising the steps of, at each switching element at an origin node:
   (i) where a link to the destination node exists, attempting to route the call to the destination node via a circuit group that is in the link;
   (ii) where a link to the destination node is not available, accessing the routing information to select a transit node and attempting to route the call via a circuit group that is in the link to the transit node;

when attempting to route a call to said virtual destination node via the link from said one of said origin nodes to the virtual destination node, attempting to route the call using one of said set of circuit groups, in dependence upon the specified proportions, wherein said one of said switching elements
   (i) determines the set S of all circuit groups with a non-zero proportion in said plurality of circuit groups;
   (ii) determines whether or not the set S is empty;
   (iii) causes the call to overflow if the set is empty;
   (iv) if the set is not empty, makes a weighted random selection of one of the circuit groups of the set S, and attempts to route the call via such circuit group;
   (v) if the selected circuit group does not have a circuit idle, removes the selected circuit group from the set S; and
   (vi) repeats steps (ii) through (v) until the call is carried or all circuit groups in the set have been exhausted and the call overflowed.

17. A method as claimed in claim 16, said network further comprising network processor means (25A) for updating said routing information and coupled to all of said switching elements by a data communications network (24A), wherein, periodically, via the data communications network, each of said switching elements communicates to the network processor means information about network conditions local to the switching element and receives from the network processor means alternate routing information including recommended transit nodes, and the network processor means computes alternate routing information in dependence upon the information communicated thereto by all of the switching elements and periodically updates the information identifying transit nodes.

18. A method as claimed in claim 17, wherein the step of computing alternate route recommendations, by the network processor means, takes into account full availability of all of the links and, where a link comprises a plurality of circuit groups, takes into account all of the circuit groups of that link.

19. A method as claimed in claim 18, wherein, at the network processor means, safe idle circuits for said link are determined by:
   (i) storing, for each link a protective allowance previously computed for that link, the protective allowance preserving capacity in the link for direct traffic;
   (ii) computing, from these protective allowances and from current link utilization, a reservation value for each circuit group of each link;
   (iii) computing, from these reservation values and from the number of idle circuits reported by switching elements of origin nodes, the number of unreserved (safe) idle circuits on each link;

and further comprising, based on these numbers of safe idle circuits, transit node recommendations for each pair of an origin node and a destination node connected directly by a link from the origin node to the destination node.

20. A method as claimed in claim 19, in a said network in which said link from said one of said origin nodes to the virtual destination node comprises a plurality of circuit groups and the storage means of said switching elements include a specified proportion for each of said circuit groups within each of said links, the method further comprising, at said switching elements, the step of, when attempting to route a call via one of these links, attempting the circuit groups of the link in dependence upon the specified proportions;

and at the network processor means, the steps of:

(i) distributing the protective allowances of the links that contain circuit group g among their circuit groups such that the reservation $RSV_g$ on circuit group g is equal to $$RSV_g = \min\left(\sum_{m \in L_g} P_{m,g} \cdot PA_m, IC_g\right)$$

producing a total reservation level $RSV_l$ for link l equal to:

$$RSV_l = \sum_{g \in G_l} RSV_g$$

and:

(ii) computing the number of idle circuits $IC_1$ as $$IC_1 = \sum_{g \in G_l} IC_g$$

and the number of safe idle circuits $SIC_1$ for link l as:

$$SIC_1 = IC_1 - RSV_1$$

where $G_1$ is the set of circuit groups of link l;

$IC_g$ is the reported number of idle circuits on circuit group g;

$L_g$ is the set of the links that contain circuit group g;

$P_{l,g}$ is said proportion used for intra-link traffic distribution, for circuit group g of link l;

$PA_1$ is the protective allowance value for link l, serving to preserve capacity for direct traffic.

21. A method as claimed in claim 19, further comprising, at the network processor means, the steps of:

(i) storing the current reservation $RSV_{l,g}$ for each circuit group of each link; and (ii) when computing the safe idle circuits;

(A) when the current $RSV_{l,g}$ is 0, adjusting such reservation $RSV_{l,g}$ to become:

$$RSV_{l,g} = \min\left(\frac{IC_g}{\#L_g}, \frac{PA_l}{\#C_l}\right)$$

(B) computing the requested reservation $RRSV_{l,g}$ using the formula:

$$RRSV_{l,g} = \begin{cases} PA_l \cdot \dfrac{RSV_{l,g}}{\sum_{h \in G_l} RSV_{l,h}} & \text{if } \sum_{h \in G_l} RSV_{l,h} > 0 \\ PA_l \cdot \dfrac{1}{\#G_l} & \text{otherwise} \end{cases}$$

(C) computing the new reservation $RSV_{l,g}$ on circuit group g for link l as:

$$RSV_{l,g} = \begin{cases} 0 & \text{if } IC_g = 0 \\ IC_g \cdot \dfrac{RRSV_{l,g}}{\sum_{m \in L_g} RRSV_{m,g}} & \text{if } \sum_{m \in L_g} RRSV_{m,g} > TC_g > 0, \\ RRSV_{l,g} & \text{otherwise} \end{cases}$$

(D) computing the reservation $RSV_g$ on circuit group g as:

$$RSV_g = \sum_{m \in L_g} RSV_{m,g}$$

(E) computing the number of idle circuits $IC_1$ for each link l as:

$$IC_l = \sum_{g \in G_l} IC_g$$

and;

(F) computing the number of safe idle circuits $SIC_1$ for link l as equal to:

$$SIC_1 = IC_1 - RSV_1$$

where:

$G_1$ is the set of circuit groups of link l;

$\#G_1$ is the number of circuit groups in link l;

$IC_g$ is the reported number of idle circuits on circuit group g;

$L_g$ is the set of the links that contain circuit group g; and $PA_1$ is the protective allowance value for link l, serving to preserve capacity for direct traffic.

22. A method as claimed in claim 16, further comprising the step of updating the proportions automatically to take account of current link utilization and current ability of said components of said virtual destination node to complete calls to the final destinations served by that virtual destination node.

23. A method as claimed in claim 16, said network further comprising network processor means (25A) for updating the routing information and updating the proportions automatically to take account of current link utilization and current ability of said components of said virtual destination node to complete to the final destinations served by that virtual destination node, the network processor being coupled to all of said switching elements by a data communications network (24A), whereby, periodically, each of said switching elements communicates to the network processor means information about network conditions local to the switching element and receives from the network processor means alternate routing information including recommended transit nodes, and the network processor means, computes alternate routing information in dependence upon the information communicated thereto by all of the switching elements and periodically updates the information identifying transit nodes, and wherein each of said components of said virtual destination node reports to the network processor means call completion capability information related to its ability to complete calls to the final destinations served by that virtual destination node, and the network processor means computes a proportion for each circuit group of said link to said virtual destination node based upon such call completion information, and upon said network conditions reported by said switching elements, and supplies those proportions to the switching element at the origin node connected to said virtual destination node by said link.

24. A method as claimed in claim 23, wherein the call completion capability information communicated to the network processor means is rendered in a similar form and treated in a similar manner by the network processor means regardless of differences between the components, characteristics of calls handled, and final destinations served by those components.

25. A method as claimed in claim 23, wherein the proportions are determined by the network processor such that traffic is distributed among the plurality of circuit groups of said link to the virtual destination node in accordance with idle capacity of the circuit groups of said link and call completion capability of said components of said virtual destination node.

26. A method as claimed in claim 25, wherein the network processor computes, for each circuit group of said link to said virtual destination node, a first weight based on its number of idle circuits, and a second weight based on the completion capability of the components of the dynamic virtual destination node, combines the first and second weights, transforms the combined weights in to proportions, combines the proportions resulting from such transformation with corresponding proportions used previously, and sends to said switching element at said one of said origin nodes the proportions resulting from such combination, said switching element updating its said storage means with the newly-computed proportions for subsequent use in distributing calls among the circuit groups of said link to said virtual destination node.

27. A method as claimed in claim 26, wherein the network processor means computes:

the first weight $W1_g$ for circuit group g as:

$$W1_g = \frac{IC_g}{\#L_g}$$

the second weight $W2_{l,g}$ for circuit group g of link l as:

$$W2_{l,g} = \begin{cases} CC_{C_{l,g}} \cdot \frac{W1_g}{\sum_{i|C_{l,i}=C_{l,g}} W1_i} & \text{if } \sum_{i|C_{l,i}=C_{l,g}} W1_i \neq 0 \\ CC_{C_{l,g}} \cdot \frac{1}{\#\{i \mid C_{l,i} = C_{l,g}\}} & \text{otherwise} \end{cases}$$

the combined weight $W_{l,g}$ for circuit group g of link l as:

$$W_{l,g} = \sqrt{W1_g \cdot W2_{l,g}}$$

the proportion $WP_{l,g}$ for circuit group g of link l as:

$$WP_{l,g} = \begin{cases} \frac{W_{l,g}}{\sum_{i \in G_l} W_{l,i}} & \text{if } \sum_{i \in G_l} W_{l,i} \neq 0 \\ \frac{1}{\#G_l} & \text{otherwise} \end{cases}$$

and the combined proportion $P_{l,g}$ for circuit group g of link l, combining the instant proportion and the previous proportion, as:

$$P_{l,g} = WP_{l,g} \cdot PWF + P'_{l,g} \cdot (1-PWF),$$

where:

$CC_c$ is the completion capability reported by component c;

$C_{l,g}$ is the component of a dynamic virtual destination node to which circuit group g in link l goes;

$G_l$ is the set of the circuit groups of link l;

$\#G_l$ is the number of circuit groups in link l;

$IC_g$ is the reported number of idle circuits on circuit group g;

$\#L_g$ is the number of links that contain circuit group g;

$P'_{l,g}$ is the previous proportion for circuit group g in link l; and

PWF is the weighting factor used for the computation of the proportions.

28. A method as claimed in claim 22, wherein said one of said switching elements derives call completion rate information for its calls to said virtual destination node and updates its proportions in dependence thereupon.

29. A method as claimed in claim 28, wherein said switching element, when attempting to route a call using said link to said virtual destination node, derives said call completion information by monitoring circuit group overflows and Release With Cause signalling messages attributable to factors remediable by the network.

30. A method as claimed in claim 29, wherein said one of said switching elements keeps, for said link to said virtual destination node, the variables:

N: the number of circuit groups in the link (2 or more).

LASTCG: the index in the link of the last circuit group that had an overflow or Release With Cause message (1 to N).

LASTOVF: the number of overflows and/or Release With Cause messages in a row for the circuit group with index LASTCG (1 or more).

CGCTR: the index in the link of the last circuit group that had its proportion updated (1 to N); and when an attempt by said one of said switching elements to route a call using a circuit group CG in said link to said virtual destination node results in an overflow or a Release With Cause message specifying one of a predetermined set of causes, the switching element modifies the proportions for that link as follows:

1. If the index of circuit group CG is LASTCG then add 1 to LASTOVF; otherwise set LASTCG to the index of circuit group CG and set LASTOVF to 1.

2. If the update is due to an overflow then:
   (a) Set MAXDEX to the minimum of LASTOVF% and the current proportion of circuit group CG.

Otherwise (the update is due to a Release With Cause message):
(b) Set MAXDEC to the minimum of (LASTOVF% multiplied by N) and the current proportion of circuit group CG.
3. Subtract MAXDEC from the current proportion of circuit group CG.
4. Repeat MAXDEC times:

(a) Add 1 to CGCTR; if CGCTR>N then set CGCTR to 1.
(b) If CGCTR=LASTCG then go back to step 4*a*.
(c) Add 1% to the current proportion of the circuit group with index CGCTR.

* * * * *